United States Patent
Bonin

(10) Patent No.: US 10,876,469 B2
(45) Date of Patent: Dec. 29, 2020

(54) CIRCULATING PISTON ENGINE

(71) Applicant: WB Development Company LLC, Marlborough, MA (US)

(72) Inventor: Walter T. Bonin, Marlborough, MA (US)

(73) Assignee: WB Development Company, LLC, Marlborough, MA (US)

(*) Notice: Subject to any disclaimer, the term of this patent is extended or adjusted under 35 U.S.C. 154(b) by 165 days.

(21) Appl. No.: 15/852,522

(22) Filed: Dec. 22, 2017

(65) Prior Publication Data

US 2018/0135511 A1 May 17, 2018
US 2020/0332708 A9 Oct. 22, 2020

Related U.S. Application Data

(63) Continuation-in-part of application No. 14/143,995, filed on Dec. 30, 2013, now Pat. No. 9,850,759.
(Continued)

(51) Int. Cl.
| | |
|---|---|
| *F02B 53/08* | (2006.01) |
| *F02B 55/08* | (2006.01) |
| *F02B 53/14* | (2006.01) |
| *F02B 53/10* | (2006.01) |
| *F02B 55/02* | (2006.01) |
| *F02B 55/16* | (2006.01) |
| *F01C 3/02* | (2006.01) |
| *F01C 9/00* | (2006.01) |
| *F01C 1/356* | (2006.01) |
| *F01C 11/00* | (2006.01) |

(52) U.S. Cl.
CPC ............ *F02B 53/08* (2013.01); *F01C 1/3568* (2013.01); *F01C 3/02* (2013.01); *F01C 9/00* (2013.01); *F01C 11/008* (2013.01); *F02B 53/10* (2013.01); *F02B 53/14* (2013.01); *F02B 55/02* (2013.01); *F02B 55/08* (2013.01); *F02B 55/16* (2013.01); *Y02T 10/12* (2013.01)

(58) Field of Classification Search
CPC ............ F01C 1/46; F01C 1/3568; F02C 5/04
See application file for complete search history.

(56) References Cited

U.S. PATENT DOCUMENTS

| | | | | |
|---|---|---|---|---|
| 2,674,234 A | * | 4/1954 | Riggle | F01C 1/3562 123/235 |
| 3,897,758 A | * | 8/1975 | Humiston | F01C 1/3566 123/205 |

(Continued)

*Primary Examiner* — Shafiq Mian
(74) *Attorney, Agent, or Firm* — Duquette Law Group LLC

(57) ABSTRACT

An engine includes a housing defining an annular bore and a piston assembly disposed within the annular bore. The engine includes at least one valve configured to oscillate between a first position within the annular bore to allow the piston assembly to travel from a first location proximate to the at least one valve to a second location distal to the at least one valve and a second position to define a combustion chamber relative to the piston assembly at the second location. The engine includes an exhaust gas port disposed in fluid communication with the combustion chamber and a fuel distribution assembly configured to mix fuel from a fuel source and air from an air source into a fuel and air mixture at a location external to the combustion chamber and to deliver the fuel and air mixture to the combustion chamber.

22 Claims, 20 Drawing Sheets

Related U.S. Application Data

(60) Provisional application No. 61/748,553, filed on Jan. 3, 2013.

(56) References Cited

U.S. PATENT DOCUMENTS

| | | | | |
|---|---|---|---|---|
| 5,535,715 A * | 7/1996 | Mouton | ............. | F01B 9/047 |
| | | | | 123/197.1 |
| 6,725,646 B2 * | 4/2004 | Callas | ............. | F02C 5/04 |
| | | | | 60/247 |
| 6,779,494 B1 * | 8/2004 | Aswani | ............. | F01B 3/04 |
| | | | | 123/56.1 |
| 7,721,685 B2 * | 5/2010 | Page | ............. | F04B 27/1054 |
| | | | | 123/43 AA |
| 2004/0099229 A1 * | 5/2004 | Gelfand | ............. | F02B 75/002 |
| | | | | 123/63 |
| 2013/0186084 A1 * | 7/2013 | Novak | ............. | F02B 63/042 |
| | | | | 60/597 |

* cited by examiner

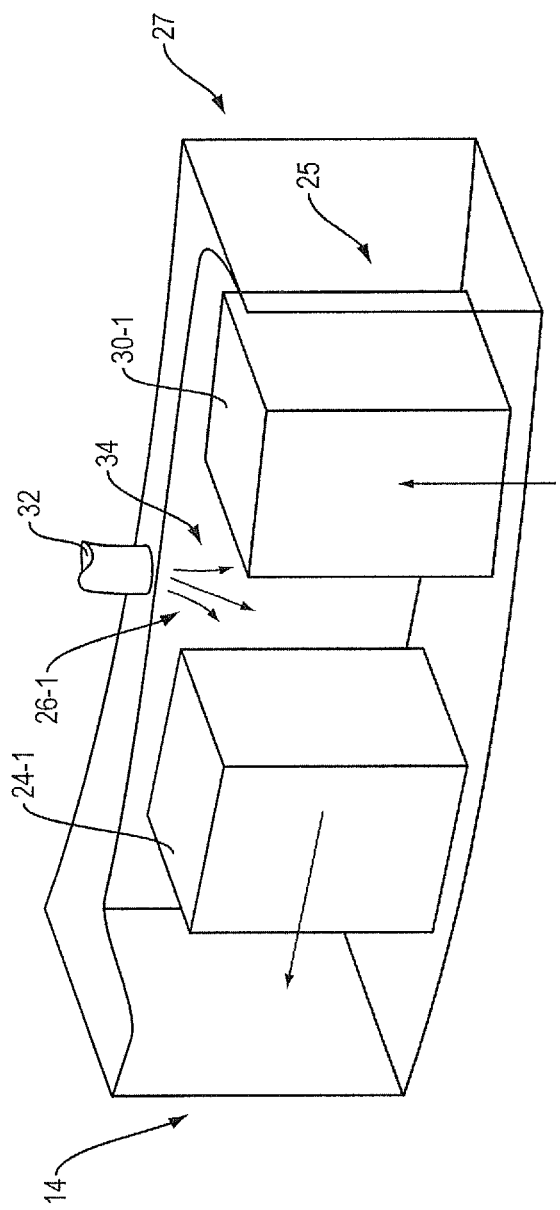

CIRCULATING PISTON ENGINE

RELATED APPLICATION

This patent application is a continuation-in-part of U.S. patent application Ser. No. 14/143,995, filed on Dec. 30, 2013, entitled "Circulating Piston Engine," which claims the benefit of U.S. Provisional Application No. 61/748,553, filed on Jan. 3, 2013, entitled "Circulating Piston Engine," the contents and teachings of each of which are hereby incorporated by reference in their entirety.

BACKGROUND

Conventional piston engines include multiple cylinder assemblies used to drive a crankshaft. In order to drive the crankshaft, each cylinder assembly requires fuel, such as provided by a fuel pump via a fuel injector. During operation, a spark plug of each cylinder assembly ignites a fuel/air mixture received from the fuel injector and causes the mixture to expand. Expansion of the ignited mixture displaces a piston of the cylinder assembly within a cylinder assembly housing to rotate the crankshaft.

SUMMARY

By contrast to conventional piston engines, embodiments of the present innovation relate to a circulating piston engine. In one arrangement, the circulating piston engine includes a housing that defines an annular bore extending about its outer periphery and a set of pistons disposed within the bore and secured to a drive mechanism or driveshaft. The engine also includes a set of valves that are moveably disposed within the bore, each valve being configured to define a temporary combustion chamber relative to a corresponding piston.

During operation, when disposed in a first position, each valve defines a combustion chamber relative to a corresponding piston, a fuel injector introduces a gas/air mixture into the chamber, and a spark plug ignites the mixture. Combustion of the mixture generates a corresponding force on each piston (e.g., along a direction that is substantially tangential to the annular bore along the direction of rotation of the drive mechanism) and propels the pistons forward within the annular bore. As each piston advances toward a subsequently disposed valve, each of the valves moves to a second position within the annular bore to allow each piston to rotate past the corresponding valve. Next, the engine repositions each valve within the bore to the first position to define the combustion chamber with the corresponding piston and the process begins again. Accordingly, as the set of pistons rotate around the perimeter of the engine, the drive mechanism generates a relatively large torque, such as an average torque of about 4500 ft-lbs. At ignition, the drive mechanism can generate a torque of about 10,000 ft-lbs. These torques are generated by the relatively large moment arm between each piston and the drive mechanism, as well as the 90° direction of the force applied to each piston.

In one arrangement, the annular bore defined by the engine housing has a relatively large circumference. During operation, when divided by the pistons, this results in a relatively long stroke distance utilizing a high percentage of the energy generated by combustion of the fuel/air mixture within the combustion chamber. Additionally, the substantially continuous motion of the pistons within the annular bore reduces the duration of time that each piston is exposed to the heat of combustion, thereby providing the engine with a relatively high thermal efficiency (e.g., relative to crankshaft-based engines). Also, the configuration of the fuel delivery system of the engine allows the fuel to be delivered to the engine in a process that is separate from, but parallel to, the combustion process. This creates, in effect, a single cycle engine where the combustion process is substantially continuous and where the power output of the engine can be increased (e.g., increased to a horsepower of about 685 @800 RPM) relative to conventional engines. Accordingly, the engine configuration results in the delivery of more precise fuel ratios, a more complete combustion of the fuel/air mixture, and shorter times at high temperatures compared to conventional piston engines. This can reduce the amount of contaminants generated by the engine and output as part of the exhaust and can increase the engine's efficiency such as to an efficiency of about 60%.

In one arrangement, embodiments of the innovation relate to an engine having a housing defining an annular bore; a piston assembly disposed within the annular bore; at least one valve configured to oscillate between a first position within the annular bore to allow the piston assembly to travel within the annular bore from a first location proximate to the at least one valve to a second location distal to the at least one valve and a second position within the annular bore to define a combustion chamber relative to the piston assembly at the second location; an exhaust gas port disposed in fluid communication with the combustion chamber; and a fuel distribution assembly, the fuel distribution assembly configured to mix fuel from a fuel source and air from an air source into a fuel and air mixture at a location external to the combustion chamber and to deliver the fuel and air mixture to the combustion chamber.

In one arrangement, embodiments of the innovation relate to an engine having a housing defining an annular bore; a piston assembly disposed within the annular bore, the piston assembly configured to be connected to a drive mechanism; at least one valve configured to oscillate between a first position within the annular bore to allow the piston assembly to travel within the annular bore from a first location proximate to the at least one valve to a second location distal to the at least one valve and a second position within the annular bore to define a combustion chamber relative to the piston assembly at the second location; an exhaust gas port disposed in fluid communication with the combustion chamber; a fuel distribution assembly, the fuel distribution assembly configured to mix fuel from a fuel source and air from an air source into a fuel and air mixture; and a compressor disposed in fluid communication with the air source, the compressor configured to perform a compression cycle and to deliver compressed air to the air source and configured to perform an intake cycle to draw excess air from the air source, the compression cycle and the intake cycle separate from a combustion process associated with the piston assembly and the at least one valve.

In one arrangement, embodiments of the innovation relate to an engine having a housing defining an annular bore; a piston assembly disposed within the annular bore, the piston assembly comprises a sealing assembly connected to the piston assembly, the sealing assembly configured to limit the flow of combustion gas past a piston of the piston assembly along a direction of rotation of the piston assembly; at least one valve configured to oscillate between a first position within the annular bore to allow the piston assembly to travel within the annular bore from a first location proximate to the at least one valve to a second location distal to the at least one valve and a second position within the annular bore to define a combustion chamber relative to the piston assembly at the second location; and an exhaust gas port disposed in fluid communication with the combustion chamber.

BRIEF DESCRIPTION OF THE DRAWINGS

The foregoing and other objects, features and advantages will be apparent from the following description of particular embodiments of the innovation, as illustrated in the accompanying drawings in which like reference characters refer to the same parts throughout the different views. The drawings are not necessarily to scale, emphasis instead being placed upon illustrating the principles of various embodiments of the innovation.

FIG. 2B illustrates a partial sectional view of a portion of the annular bore of FIG. 2A, according to one arrangement.

DETAILED DESCRIPTION

Embodiments of the present innovation relate to a circulating piston engine. In one arrangement, the circulating piston engine includes a housing that defines an annular bore extending about its outer periphery and a set of pistons disposed within the bore and secured to a drive mechanism or driveshaft. The engine also includes a set of valves that are moveably disposed within the bore, each valve being configured to define a temporary combustion chamber relative to a corresponding piston.

Figure 1:
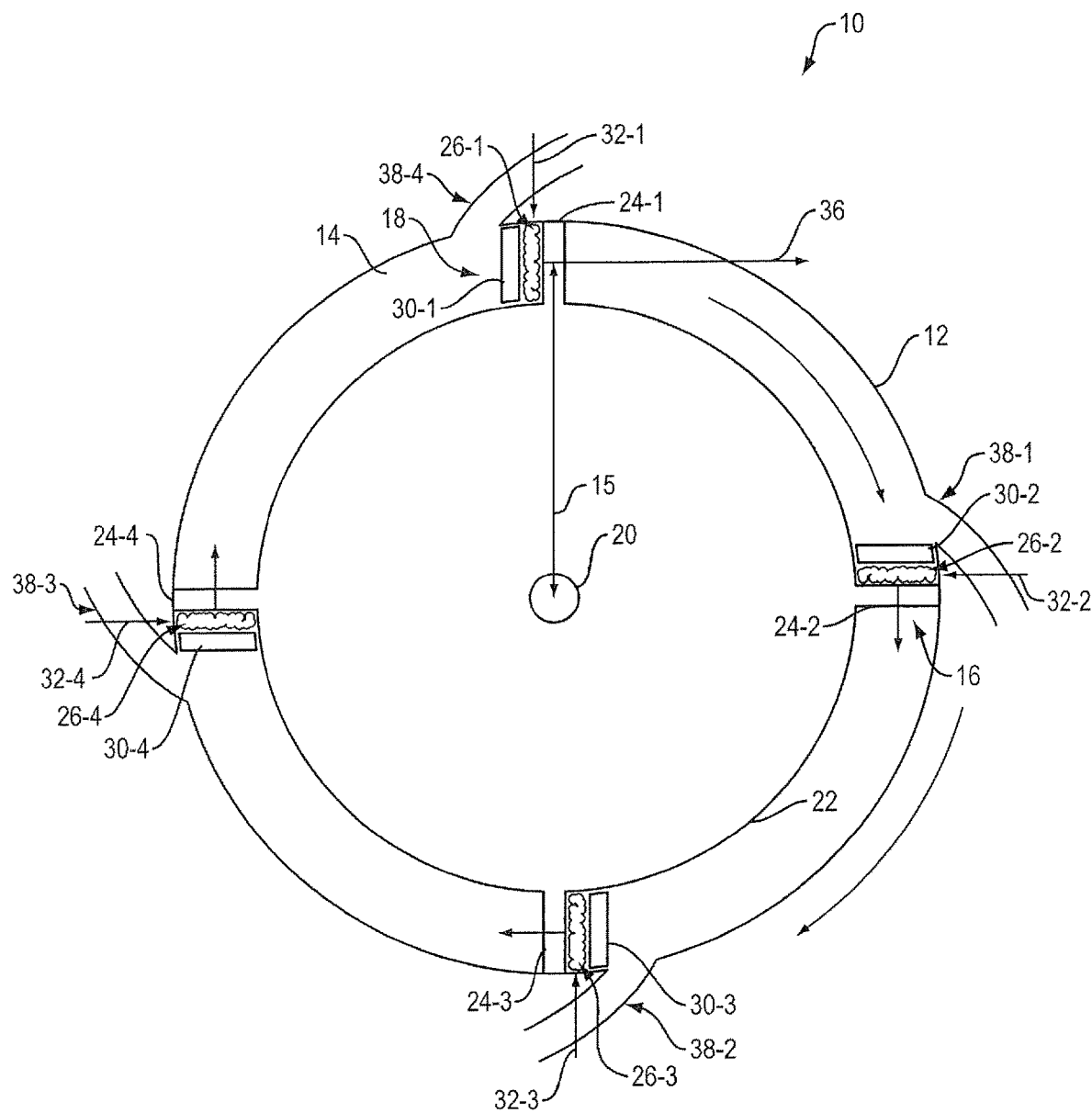
FIG. 1 illustrates an overhead, cross-sectional, schematic view of an engine having a piston assembly disposed in a first position within the housing, according to one arrangement

FIG. 1 illustrates an overhead, cross-sectional, schematic view of a circulating piston engine 10, according to one arrangement. The engine 10 includes a housing 12 that defines an annular channel or bore 14 and that contains a piston assembly 16 and a valve assembly 18.

The annular bore 14 is disposed at an outer periphery of the housing 12. While the annular bore 14 can be configured in a variety of sizes, in one arrangement, the annular bore 14 is configured as having a radius 15 of about twelve inches relative to an axis of rotation 21 of the piston assembly 16. As will be described below, with such a configuration, the relatively large radius 15 of the annular bore 14 disposes the engine combustion chamber at a maximal distance from the axis of rotation 21 and allows the piston assembly to generate a relatively large torque on an associated drive mechanism 20, such as a drive shaft, disposed at the axis of rotation.

The annular bore 14 can be configured with a cross-sectional area having a variety of shapes. For example, with reference to FIG. 2B, in the case where a piston 24 of the piston assembly 16 is configured to define a generally rectangular cross-sectional area 25, the annular bore 14 can also define a corresponding rectangular cross-sectional area 27. In such an arrangement, the cross-sectional area 27 of the annular bore 14 is larger than the cross sectional area 25 of the piston 24 to allow the piston 24 to travel within the annular bore 14 during operation.

Returning to FIG. 1, in the arrangement illustrated, the piston assembly 16 is disposed within the annular bore 14 and is coupled to the drive mechanism 20 via a flywheel 22. While the piston assembly 16 can include any number of individual pistons 24, in the arrangement illustrated, the piston assembly 16 includes four pistons 24-1 through 24-4 disposed about the periphery of the flywheel 22. While the pistons 24 can be disposed at a variety of locations about the periphery of the flywheel 22, in one arrangement, opposing pistons are disposed at an angular orientation of about 180° relative to each other and adjacent pistons disposed at an angular orientation of about 90° relative to each other. For example, as illustrated, the first and third pistons 24-1, 24-3 are disposed on the flywheel 22 at about 180° relative to each other and the second and fourth pistons 24-2, 24-4 are disposed on the flywheel 22 at about 180° relative to each other. Additionally, the first and second pistons 24-1, 24-2 are disposed on the flywheel 22 at a relative angular orientation of about 90°, the second and third pistons 24-2, 24-3 are disposed on the flywheel 22 at a relative angular orientation of about 90°, the third and fourth pistons 24-3, 24-4 are disposed on the flywheel 22 at a relative angular orientation of about 90°, and the fourth and first pistons 24-4, 24-1 are disposed on the flywheel 22 at a relative angular orientation of about 90°.

During operation, the pistons 24 of the piston assembly 16 are configured to rotate within the annular bore 14. As illustrated, the pistons 24 are configured to rotate within the annular bore 14 in a clockwise direction. However, it should be noted that the pistons can rotate within the annular bore 14 in a counterclockwise manner as well. Such rotation causes rotation of the drive mechanism 20.

The valve assembly 18 includes a set of valves 30 configured to define combustion chambers 26 relative to the respective pistons 24 of the piston assembly 16. For example, while the valve assembly 18 can include any number of individual valves 30, in the arrangement illustrated, the valve assembly 18 includes valves 30-1 through 30-4 disposed within the annular bore 14 of the housing 12. While the valves 30 can be disposed at a variety of locations about the periphery of the housing 12, in one arrangement, opposing valves are disposed at an angular orientation of about 180° relative to each other and adjacent valves disposed at an angular orientation of about 90° relative to each other. For example, as illustrated, the first and third valves 30-1, 30-3 are disposed about the periphery of the housing 12 at about 180° relative to each other and the second and fourth valves 30-2, 30-4 are disposed about the periphery of the housing 12 at about 180° relative to each other. Additionally, the first and second valves 30-1, 30-2 are disposed about the periphery of the housing 12 at a relative angular orientation of about 90°, the second and third valves 30-2, 30-3 are disposed about the periphery of the housing 12 at a relative angular orientation of about 90°, the third and fourth valves 30-3, 30-4 are disposed about the periphery of the housing 12 at a relative angular orientation of about 90°, and the fourth and first valves 30-4, 30-1 are disposed about the periphery of the housing 12 at a relative angular orientation of about 90°. In such an arrangement, the relative positioning of the valves 30 of the valve assembly 18 corresponds to the relative positioning of the pistons 24 of the piston assembly 16.

Figure 2A:
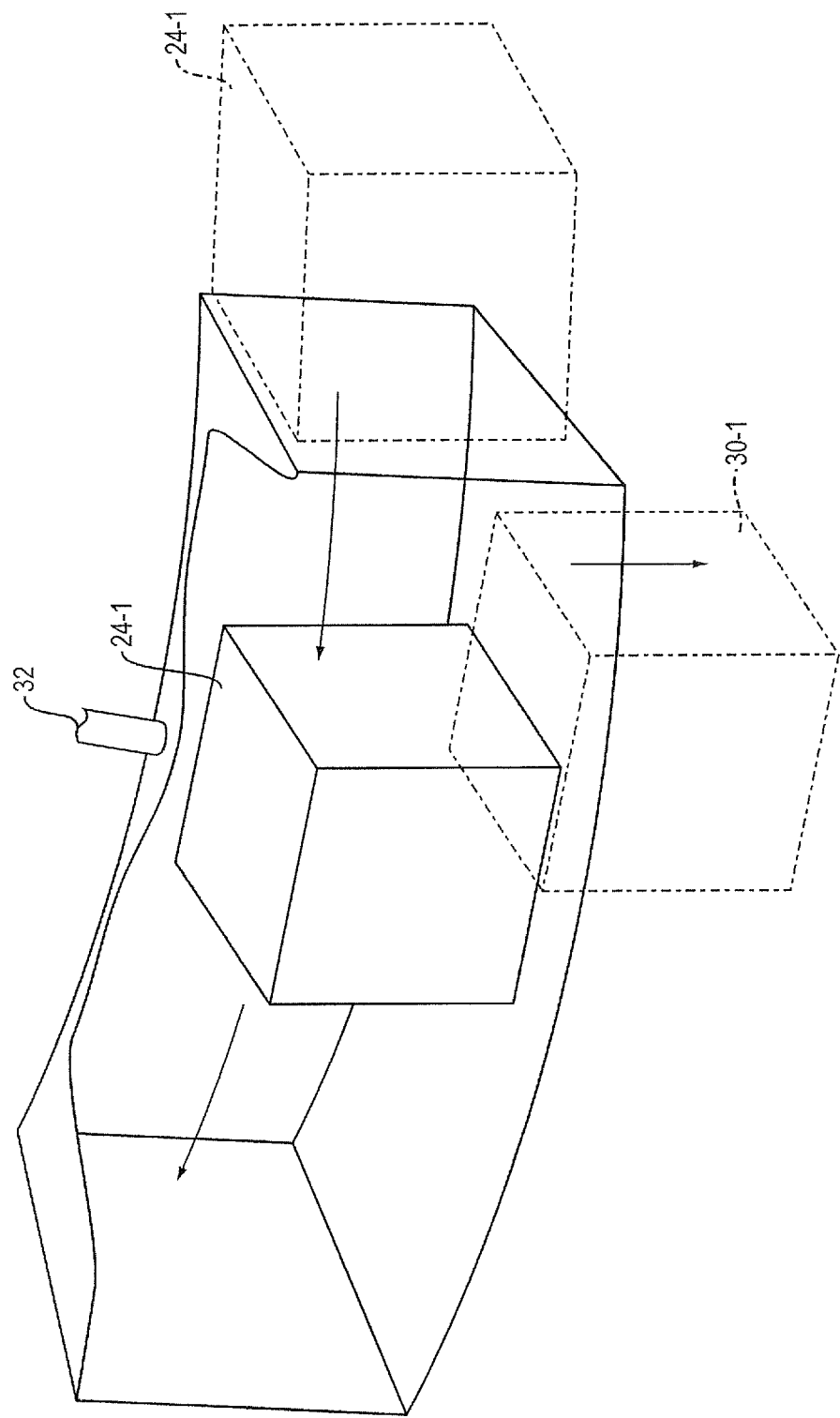
FIG. 2A illustrates a partial sectional view of a portion of an annular bore of FIG. 1, according to one arrangement.

Each valve 30 of the valve assembly 18 is moveably disposed within the annular bore 14 to create a temporary combustion chamber 26 relative to a corresponding piston 24. For example, during operation, each piston 24 of the piston assembly 16 rotates within the annular bore 14 and toward a valve 30 of the valve assembly 18. Taking piston 24-1 and valve 30-1 as an example, and with reference to FIG. 2A, as the piston 24-1 transitions within the annular bore 14 from a distal position to a proximal position relative to the corresponding valve 30-1, the valve 30-1 is disposed in a first position relative to the annular bore 14. In the first position, the valve 30-1 is at least partially withdrawn from the travel path of the piston 24-1 within the annular bore 14 to allow the piston 24-1 to advance along its travel path. With reference to FIG. 2B, when the piston 24-1 reaches a given location within the annular bore 14 (e.g., once the piston 24-1 has passed the valve 30), the valve 30-1 moves to a second position relative to the annular bore 14 (e.g., to a closed position), such as illustrated. With such positioning, the valve 30-1 defines the combustion chamber 26-1 relative to the piston 24-1 and is configured as a bulkhead against which combustion can work to produce power.

For example, with each valve 30 disposed in a closed position as indicated in FIG. 1, a fuel injector 32 then delivers a fuel-air mixture 34 into the associated combustion chambers 26 which can then be ignited by an ignition device (not shown) such as a spark plug. As the ignition devices ignite the fuel-air mixture 34 in all four of the combustion chambers 26-1 through 26-4 in a substantially simultaneous manner, the expansion of the fuel-air mixture 34 against each valve 30-1 through 30-4 generates a load 36 on each of the corresponding pistons 24-1 through 24-4 to propel each piston 24-1 through 24-4 along the rotational travel path defined by the annular bore 14.

Figure 3:
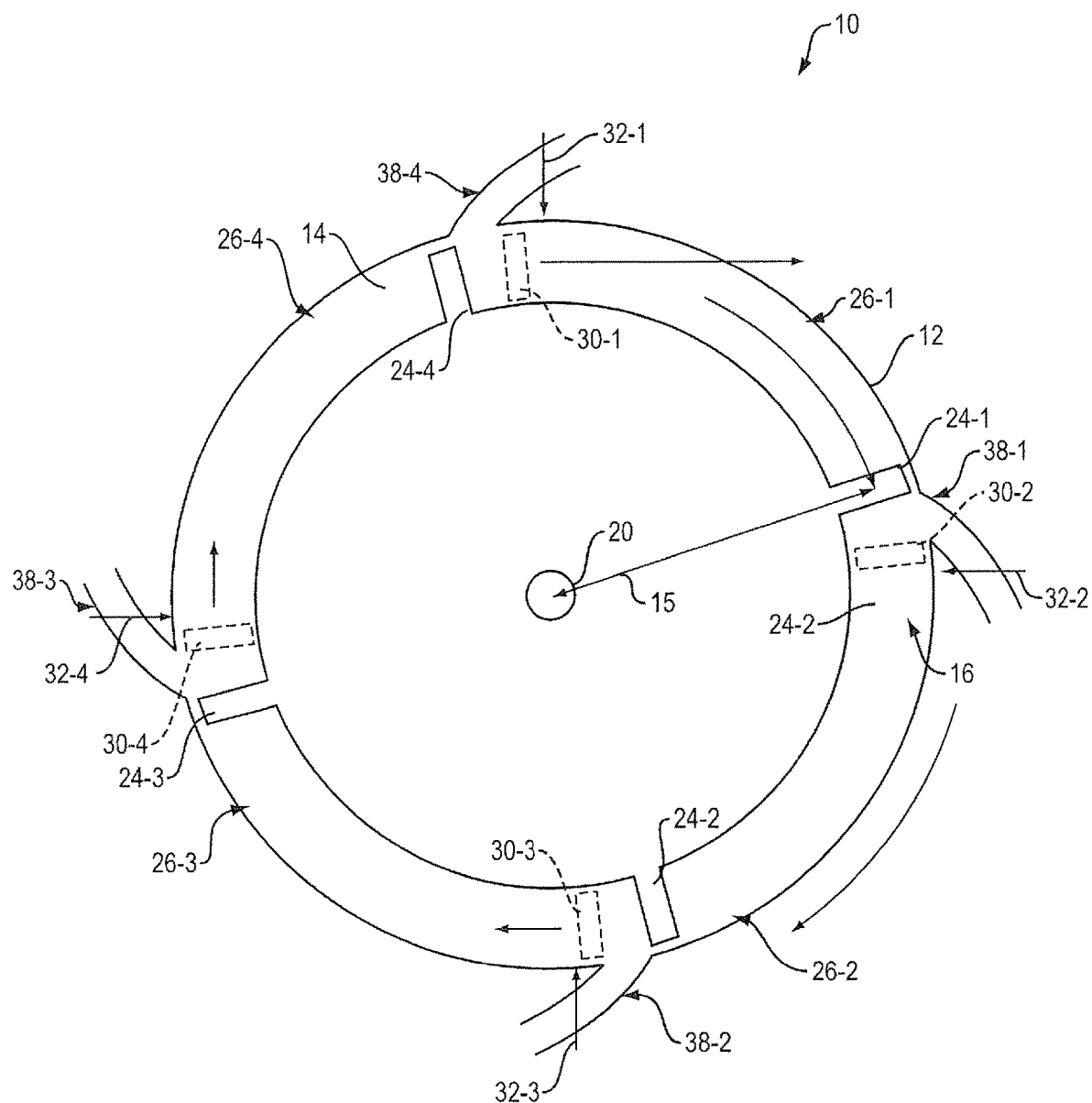
FIG. 3 illustrates an overhead, cross-sectional, schematic view of the engine of FIG. 1 having a piston assembly disposed in a second position within the housing, according to one arrangement.

With reference to FIG. 3, each of the pistons 24-1 through 24-4 travels within the bore 14 along a relatively large stroke distance, such as a distance of between about 12 inches and 15 inches, toward the next valve 30. At a certain point in the bore 14, such as at the end of a stroke length 13 as illustrated in FIG. 1, each piston 24 passes a corresponding exhaust port 38 (i.e., disposed proximal to the subsequent valve 30) which vents the spent gas contained in the chamber 26 to the atmosphere. For example, as piston 24-1 passes the exhaust port 38-1, spent gas contained in the chamber 26-1 between the piston 24-1 and the valve 30-1 can exit the chamber 26-1 via the exhaust port 38-1.

The exhaust ports 38, in one arrangement, are configured as passive ports which are open to the atmosphere and which do not require mechanical components. In one arrangement, each exhaust port 38 is configured as being relatively large to provide efficient exhausting to the engine 10. For example, the stroke distance between the piston 24 and valve 30, such as a stroke distance of between about 12 inches and 15 inches, can form part of each exhaust port 38 to increase the overall length of the port 38.

Additionally, as each piston 24 approaches the subsequently disposed valve 30, each valve 30 moves from the second, closed position (FIGS. 1 and 2B) to the first position (FIGS. 3 and 2A) relative to a corresponding piston 24. For example, as the piston 24-1 approaches the valve 30-2, the valve 30-2 is at least partially withdrawn from the bore 14 to allow the piston 24-1 to move past the valve 30-2. Once each of the pistons 24 have translated to a location distal to the corresponding valves 30, the corresponding valves 30 are moved to the first position and the process begins again. Accordingly, during operation, the engine 10 can generate up to sixteen combustion events per revolution (i.e., each of four pistons 24 experiencing up to four combustion events in a single revolution), thereby causing the piston assembly 16 to rotate the drive mechanism 20.

In use, the pistons 24 and valve assembly 16 are disposed at the outer perimeter of the engine housing 12, such as at distance of about twelve inches from the drive mechanism 20. With the combustion force applied to the pistons 24 along a direction that is tangent to the direction of rotation and perpendicular to the distance 15 from the drive mechanism 20, such combustion force can maximize torque on the drive mechanism 20. Additionally, the relatively long stroke path of the pistons 24, the presence of the exhaust ports 38, and the ability of the engine 10 to customize the number of combustion events generated in the bore 14 can enhance the performance of the engine 10. For example, the engine 10 can produce a relatively large amount of continuous power (e.g., a horsepower of about 685 @800 RPM) with a relatively high torque (e.g., an average torque of about 4500 ft-lbs) and efficiency (e.g., an efficiency of about 60%) relative to conventional engines having an efficiency of about 25-30%.

In one arrangement, the operation of the engine 10 can considerably reduce pollutants compared with current engines. For example, the relatively long stroke distance, among other factors, can reduce unburnt hydrocarbons and carbon monoxide contained in the combustion chamber 26. Oxides of nitrogen should also be reduced since the amount formed during combustion is proportional to temperature and dwell times. The rapid and continuous motion of the piston 24 within the bore 14 can reduce their formation, as dwell times will be reduced.

As indicated above, the engine 10 can generate relatively large amounts of torque (e.g., 15 times the torque generated by conventional engines). In conventional piston engines, complex six-speed (and greater) transmissions are needed to multiply the engine's torque for adequate performance, which add to the weight, expense, and complexity to the transmissions. However, because the engine 10 described above generates a relatively higher amount of torque, the engine requires fewer gear ratios than conventional engines and, hence, utilizes a lighter and less expensive transmission.

It should be noted that the relatively high torque generated by the engine 10 can be managed by adjustment of the combustion events (i.e., the firing sequence of the pistons 30 and detonation mechanisms) within the engine 10. For example, each piston 24 can experience four combustions per revolution such that the entire piston assembly 16 experiences a total of sixteen combustions per revolution. In order to control the power and output torque of the engine 10 as necessary, the engine 10 can fire anywhere from one to sixteen times per revolution. For example, the combustion chambers 26 are arranged around the periphery and can be fired independent from each other. This allows firing of a combustion event from one to sixteen times per revolution to adjust the velocity of the pistons 24 within the annular bore and to adjust the power or output torque generated by the engine 10. Such a configuration of the engine 10 contrasts the use of a throttle in conventional engines, which manages flow of air and is relatively less efficient.

As indicated above, each valve 30 of the valve assembly 18 is moveably disposed within the annular bore to create a temporary combustion chamber 26 relative to a corresponding piston 24. The valve assembly 18 and valves 30 can be configured in a variety of ways to provide such temporary combustion chamber creation. FIGS. 4 through 7 illustrate one arrangement of a valve assembly 118 having a valve 130 configured to reciprocate within the bore 14.

Figure 4:
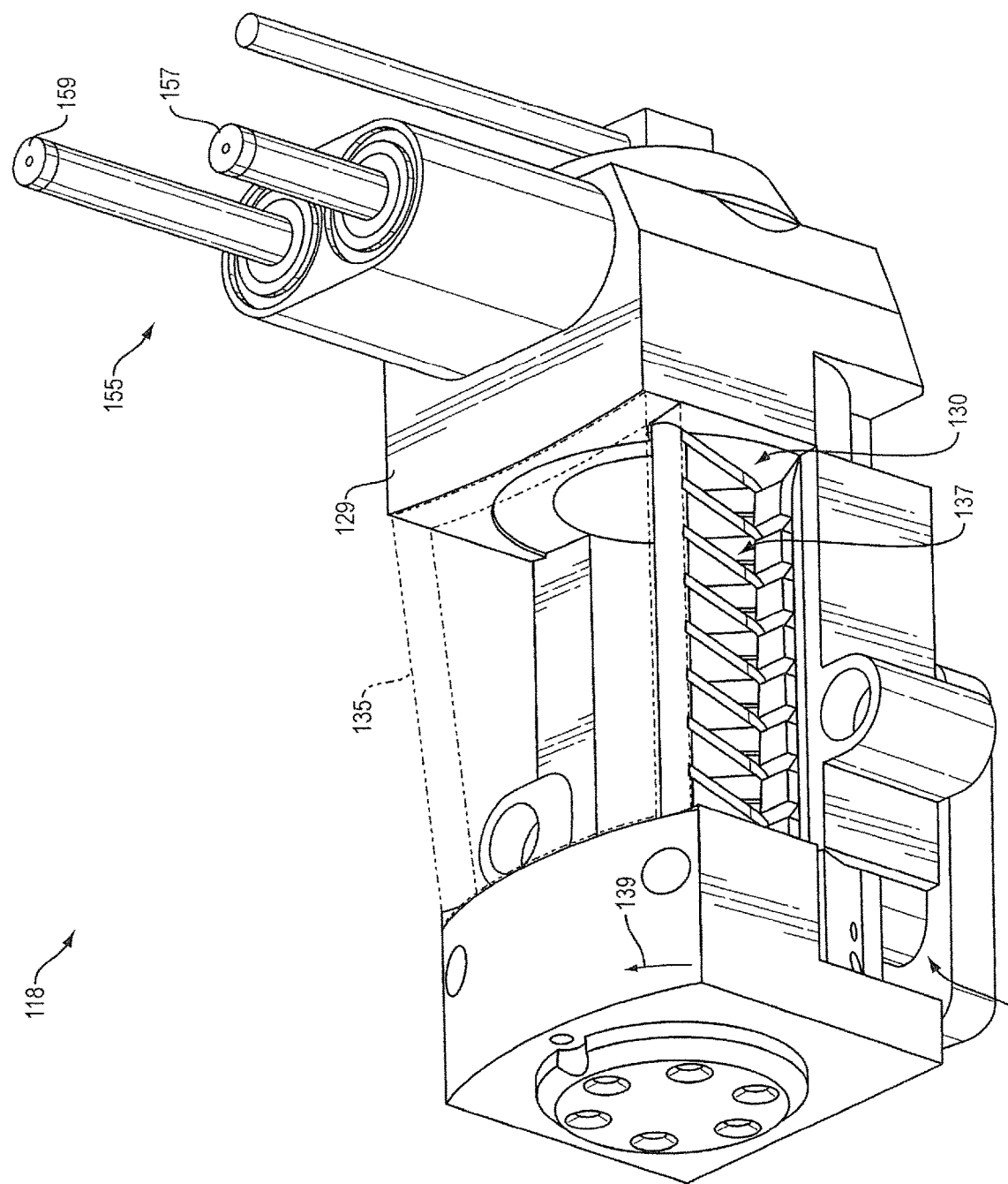
FIG. 4 illustrates a front view of an arrangement of a valve of FIG. 1, according to one arrangement.
Figure 5:
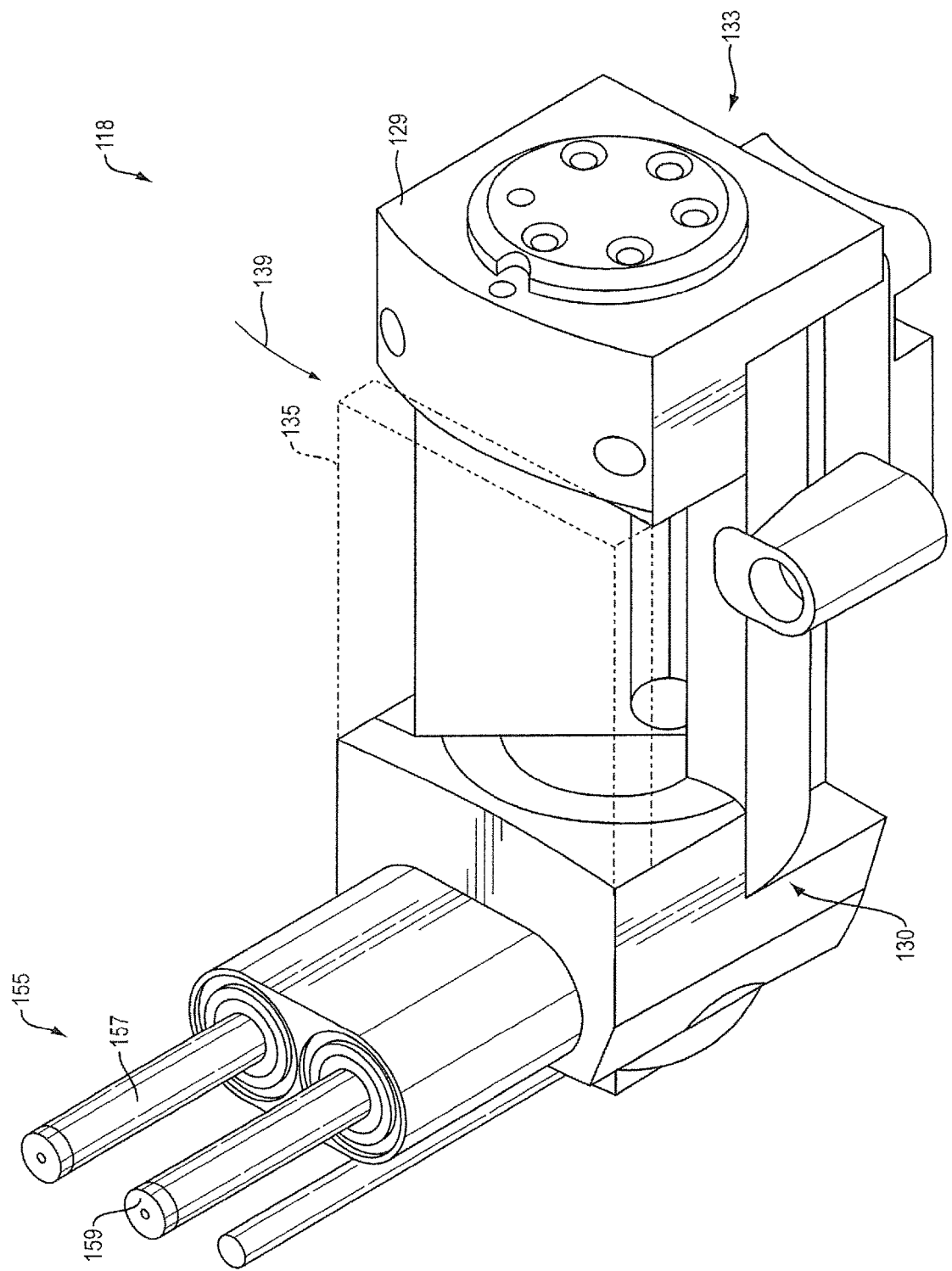
FIG. 5 illustrates a rear view of the valve of FIG. 4, according to one arrangement.
Figure 6:
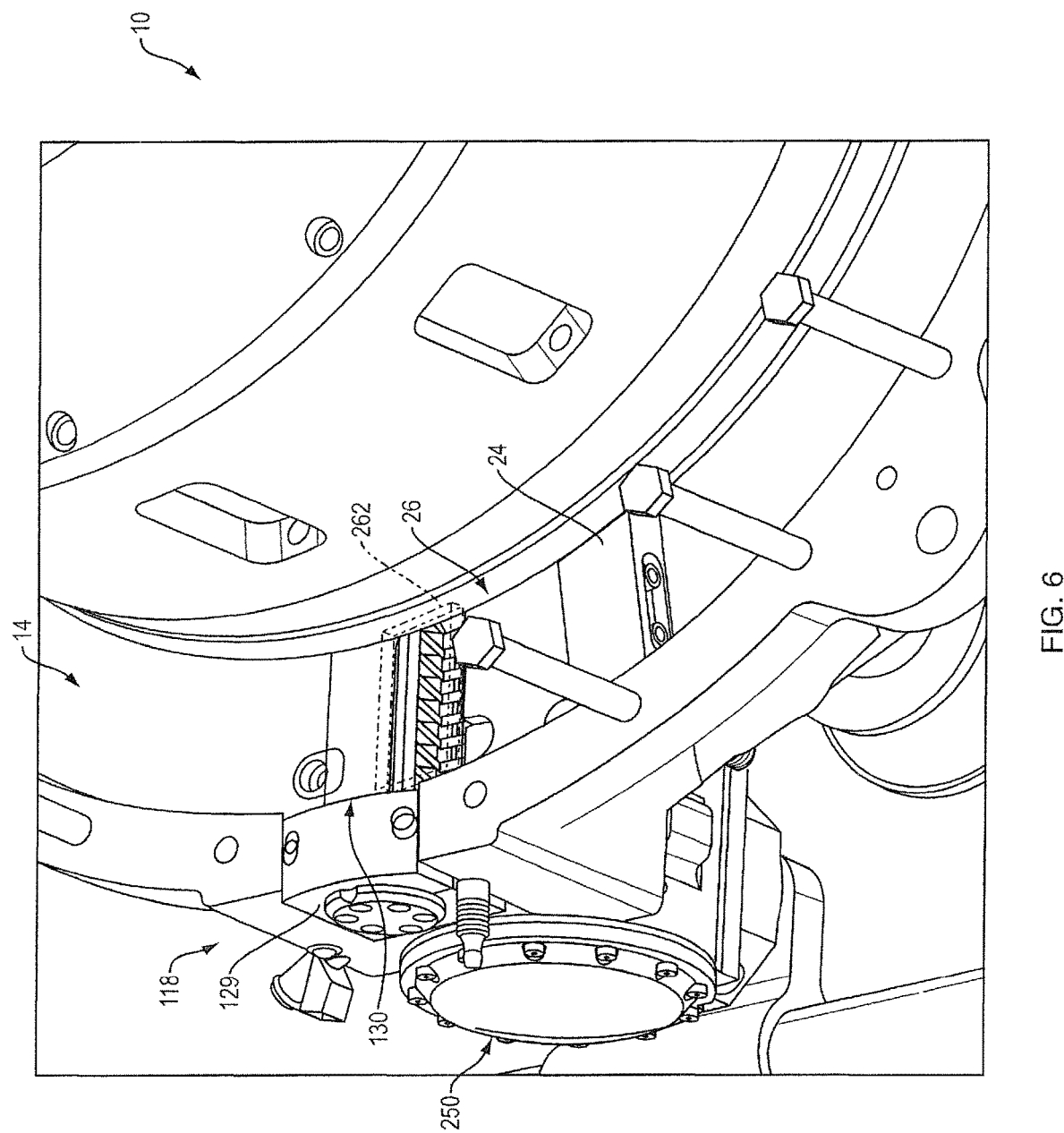
FIG. 6 illustrates the valve of FIG. 4 disposed in an engine, according to one arrangement.

In one arrangement, the valve assembly 118 includes a housing 129 with the valve 130 being rotatably coupled to the housing 129. The valve 130 is configured to pivot or oscillate within the housing 129 between a first position that allows a piston 24 to travel within the annular bore 14 past the valve 130 and second position that defines the combustion chamber 26 relative to the piston 24. For example, the valve 130 is configured with a notch that defines a channel 135 relative to the annular bore 14 of the housing 10. When the valve 130 is disposed in the first position, as indicated in FIGS. 4 and 5, the channel 135 is configured to allow a piston 24 to travel within the annular bore 14 between a first location proximal to the valve assembly 118 (such as indicated by valve 30-1 relative to piston 24-4 in FIG. 3) and a second location distal to the valve assembly 118. As the valve 130 pivots or rotates within the housing 129 along direction 139, a bulkhead portion 137 of the valve 130 enters the annular bore 14 to define the combustion chamber 26 with the piston 24, as illustrated in FIG. 6.

In one arrangement, a portion of the fuel injector 32 of the engine 10 is integrally formed with the valve 130. For example, with reference to FIGS. 4-6, the housing 129 includes a fuel source port 133 disposed in fluid communication with a set of openings 141 (see FIG. 7A) defined by the valve 130 and with a fuel source and an air source or air intake assembly 250 (see FIGS. 6 and 9A-9C). During operation, the valve 130 is configured to deliver a fuel-air mixture, which includes fuel from the fuel source and air from the air source 250, through the set of openings 141 and into the combustion chamber 26, as illustrated in FIG. 6.

In one arrangement, the rotation of the valve 130 within the housing 129 can control delivery of the fuel and air from the fuel source port 133 to the set of openings 141 of the valve 130 and, subsequently, to the combustion chamber 26. For example, when the valve 130 is disposed in the first position, as indicated in FIGS. 4 and 5, the set of openings 141 can be aligned with a wall of the housing 129 to fluidly decouple the set of openings 141 from the fuel source port 133. In such an arrangement, the wall housing 129 blocks the delivery of fuel and air from the fuel source and air source 250 to the openings 141. Accordingly, as the piston 24 rotates past the valve 130, the valve 130 cannot deliver fuel or air into the annular bore 14. When the valve 130 rotates to the second position as illustrated in FIG. 6, the set of openings 141 align with and fluidly couple to the fuel source and air source 250 via the fuel source port 133. Accordingly, with such positioning, the valve 130 can direct the fuel and air into the combustion chamber 26 defined between the piston 24 and the valve 130.

Actuation of the valve 130 between the second, closed position to the first, open position utilizes a synchronous actuation mechanism to limit or prevent mechanical contact between the circulating piston 24 and the valve 130 during operation. Conventional engines utilize a cam and cam follower to drive a valve to an open position and a heavy-duty return spring to move the valve to a closed position. The return springs in conventional engines, however, can cause problems due to resonance in the return spring at high operating frequencies. When the operating frequency of the engine matches the natural frequency of the spring, resonance occurs in the spring which can dispose the valve in a position other than the position prescribed by the motion of the cam.

Additionally, resonance can cause a phenomenon known as valve float. In the case of resonant oscillation, the return spring does not have enough stored energy to accelerate the mass of the valve. As a result, the valve effectively floats in a substantially stationary position. Accordingly, as the cam follower leaves and recontacts the cam surface, contact between the cam follower and the cam face generates a contact stress, known as von Mises stress. If the contact stress exceeds the yield strength of the cam surface, galling of the cam surface can occur.

Figure 7A:
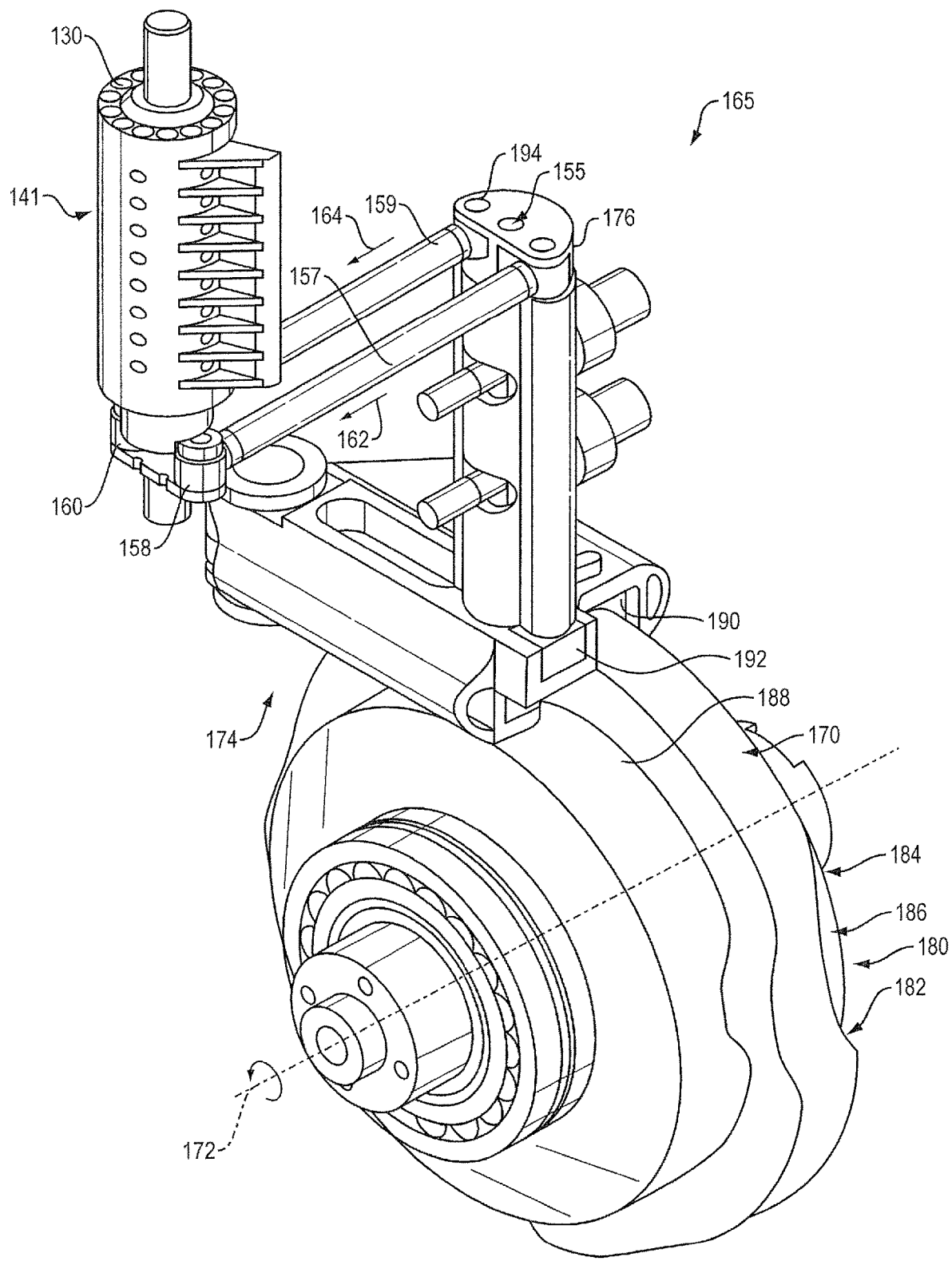
FIG. 7A illustrates an arrangement of a toggling mechanism coupled to the valve of FIG. 4, according to one arrangement.
Figure 7B:
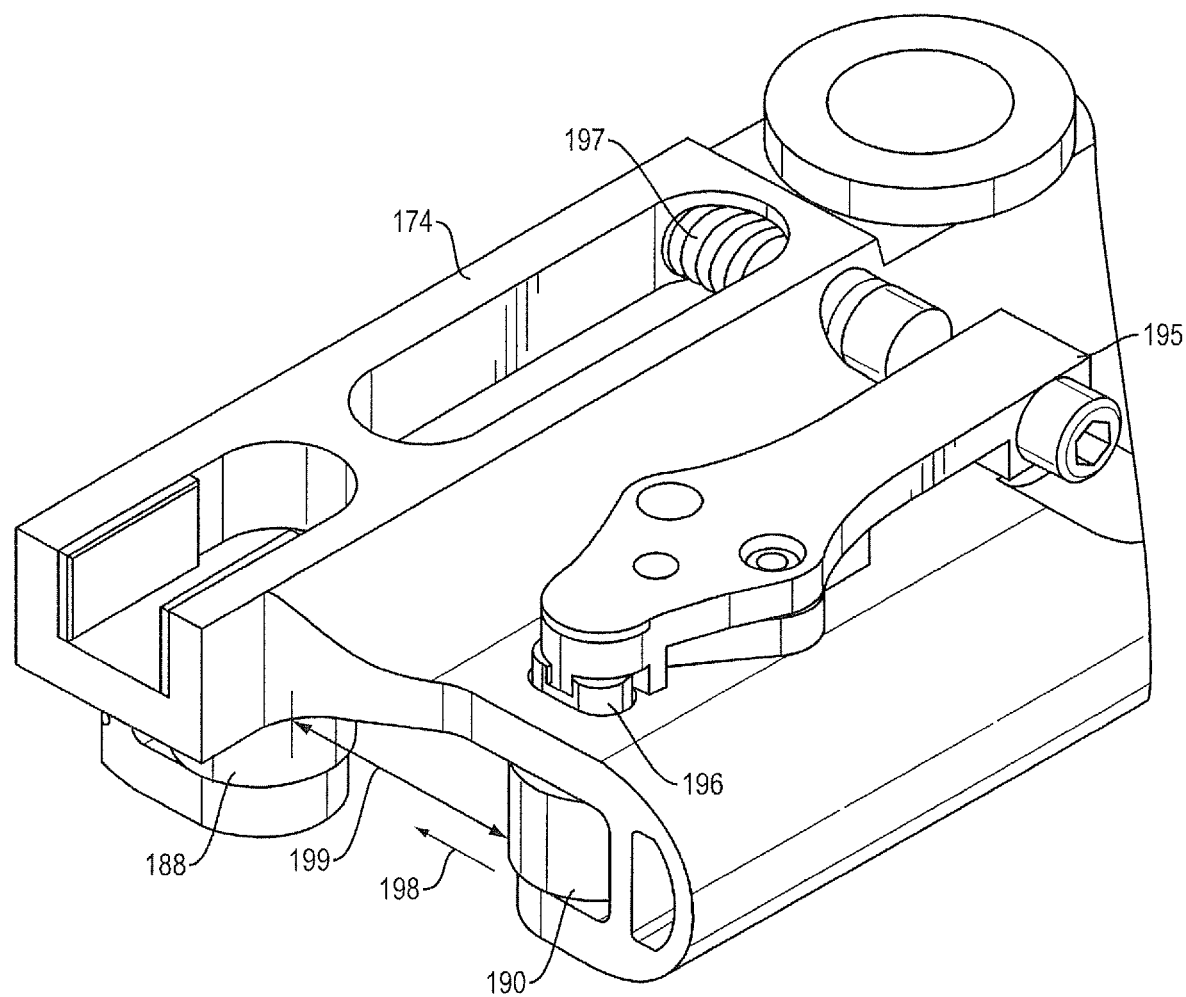
FIG. 7B illustrates a perspective view of a rocker arm of FIG. 7A, according to one arrangement.

While the valve 130 can be actuated within the housing 129 in a variety of ways, in one arrangement, to minimize issues caused by possible resonance of the valve, the valve assembly 118 includes a toggling assembly 155, as shown in FIGS. 4, 5, and 7A, configured to toggle the valve 130 within the housing 129. The toggling assembly 155 is configured to exert positive loads on the valve 130 (i.e., apply a push/push motion on opposing ends of the valve 130) when positioning the valve 130 between the first and second positions. For example, with reference to FIG. 7A, the toggling assembly 155 can include a first arm 157 coupled to a first end 158 of the valve 130 and a second arm 159 coupled to a second end 160 of the valve 130. During operation, the first arm 157 is configured to generate a first, linear, positive load 162 on the first or proximal end 158 of the valve 130 along a positive displacement direction to pivot the valve 130 toward the first position, as illustrated in FIGS. 4 and 5. Further during operation, the second arm 159 is configured to generate a second, linear, positive load 164 on the second or distal end 160 of the valve 130 along the positive displacement direction to pivot the valve 130 toward the second position, as illustrated in FIG. 6.

The toggling assembly 155 can be actuated in a variety of ways. In one arrangement, as illustrated in FIG. 7A, the arms 157, 159 of the toggling assembly 155 are coupled to a cam assembly 165 that includes a barrel cam, such as a conjugate splined barrel cam 170, a rocker arm 174, and a toggle element 176 coupled between the rocker arm 174 and the first and second arms 157, 159.

The conjugate splined barrel cam 170 defines a spline profile 180 for each valve 130. The profile 180 of the cam 170 includes a rise portion 182, a dwell portion 186, and a fall portion 184 which defines the relative movement of the valve 130 during operation. During operation, as the cam rotates about a longitudinal axis 172, the profile 180 imparts an oscillating motion to the valve 130 through the rocker arm 174 and toggle element 176.

The rocker arm 174 is configured to translate the motion of the profile 180 into a reciprocation motion of the toggle element 176. For example, the rocker arm 174 includes a first cam follower 188 and a second cam follower 190, each disposed in proximity to the profile 180 of the cam 170. The rocker arm 174 includes a sliding/pivot joint 192 which actuates the toggle element 176 about longitudinal axis 194 in response to the motion of the rocker arm 174. Because the total angular motion of the toggle element 176 is bisected evenly, when one arm or push rod 157 moves in one direction, the other arm or push rod 159 is displaced by an equal amount in the opposite direction. Cam assembly 165, accordingly, achieves substantially zero backlash during operation when opening and closing the combustion valve 130.

During operation, as the conjugate splined barrel cam 170 rotates about an axis 172, a spline profile or element 180 of the cam 170 actuates the arms 157, 159 to drive the valve 130 between the first and second positions. For example, the cam profile 180 drives the valve 130 to an open position and remains open as the piston 24 passes by and then drives the valve 130 to the closed position when the piston 24 has passed.

In one arrangement, to increase the longevity and lower frictional losses of the toggling assembly 155 and the cam assembly 165, all joints can be configured as roller bearings that can be either pressure lubricated or disposed within an oil bath. In one arrangement, the two cam followers 188, 190 that capture the cam profile 180 are formed from a compliant material to allow for tolerance mismatch in the rocker arm 174, the two cam followers 188, 190, and the relative pivot position of the rocker arm 174 during operation.

Although tolerance could be held to the standards to minimize or prevent backlash, such standardization can add cost to manufacturing process. In one arrangement, to limit the use of tolerance standards, and with reference to FIG. 7B, the second cam follower 190 is secured to an oscillating lever 195 via a diamond-shaped pin 196. The oscillating lever 195, in turn, is coupled to the rocker arm 174 via a spring mechanism 197. The diamond-shaped pin 196 allows relatively small movements of the second cam follower 190 in one direction 198 while maintaining the position of the first cam follower 188. In the application shown in FIG. 7B, the diamond-shaped pin 196 allows a distance 199 between the cam followers 188, 190 to be constantly adjusted by a compressive force, but maintains a radial position of the second cam follower 190 relative to its own pivot point. Accordingly, with the first cam follower 188 and the second cam follower 190 configured to apply a preload force against the spline profile 180, the rocker arm 174 minimizes the use of tolerance standards as part of the cam assembly 165.

The absence of springs in toggle assembly 155 and the cam assembly 165 insures that the valve position is controlled strictly by the cam profile 180 which is important to the functionality of the engine 10 and can limit or prevent any contact between the circulating piston 24 and the valves 130. In the event contact were to occur due to a statistical failure, the valve 130 is designed to move in the same direction as the circulating piston 24 and would most likely be disposed in a closed position in the event of failure.

Conventional engines utilize four stages or cycles to produce power. These cycles include an intake cycle which provides the intake of air and fuel through a system of valves created by piston retraction, a subsequent compression cycle to compress the air and fuel, an ignition/combustion/power cycle, and an exhaust cycle to forcibly exhaust combustion byproducts through a separate valve system. The four stages are performed in a serial fashion by a piston contained within a cylinder of the engine.

In conventional piston engines, the pressure of the hot gasses created by the combustion of the air and fuel mixture contained within the cylinder can create blowby where the hot gasses and their corrosive byproducts are forced past the piston rings into the interior of the engine. As the gasses and byproducts pass into the engine, they can burn a portion of the lubricating oil contained within the cylinder, thereby adding to pollutant creation and corruption of the oil supply. As a result, conventional engines require relatively frequent oil changes. Additionally, conventional piston engines do not allow for relatively high compression ratios because of the resulting knocking/autoignition caused by the relatively long dwell times which can damage the piston and cylinder walls.

Figure 8:
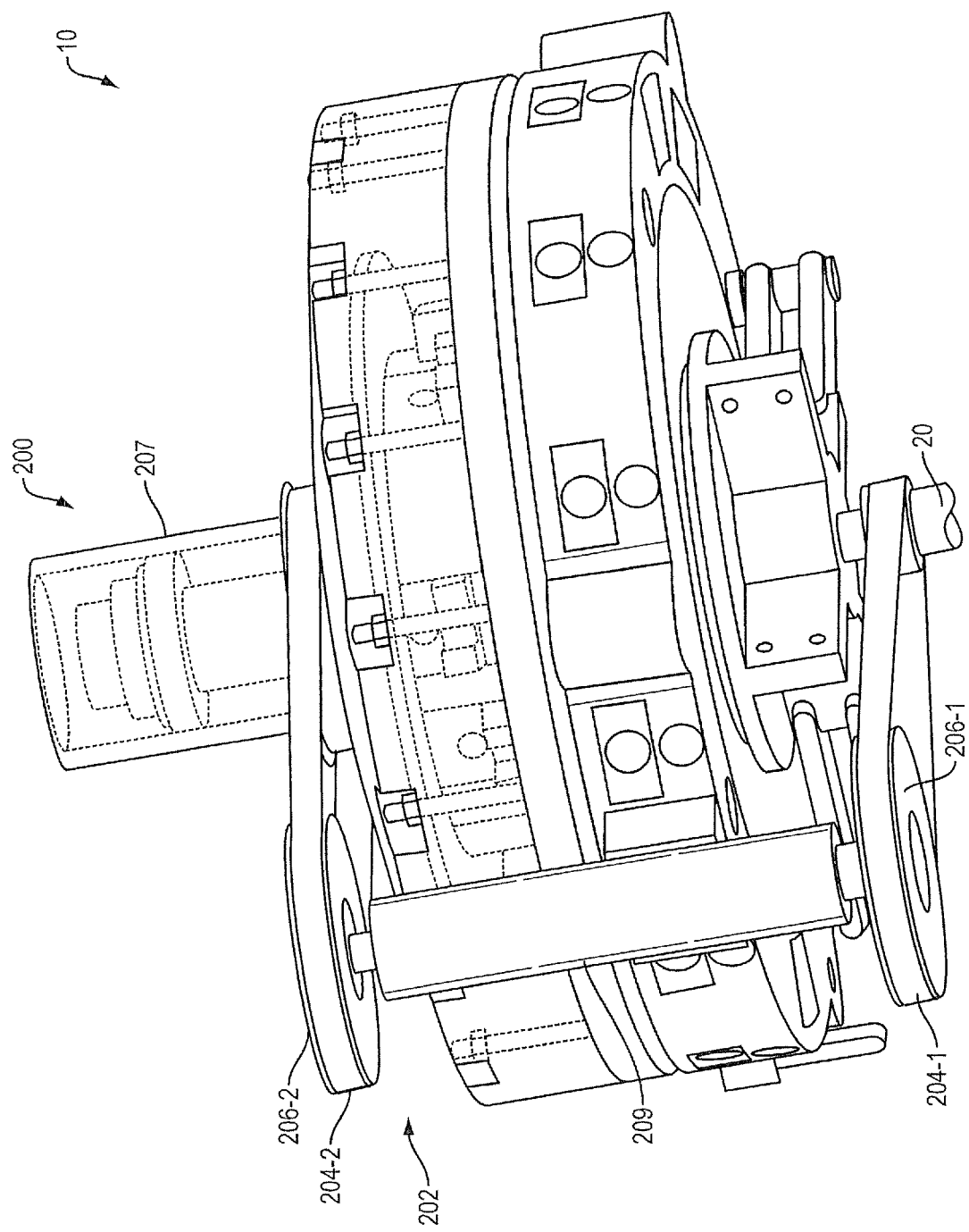
FIG. 8 illustrates an arrangement of a compressor of the engine of FIG. 6.

With reference to FIG. 8, the engine 10 can include a compressor 200 configured to perform an intake cycle to remove air from the air source 250 and a compression cycle to compress the air and fuel. The compressor 200 performs these cycles independent from the power and exhaust cycles performed by the valve and piston assemblies 16, 18. By separating the compression process from the combustion process, as found in conventional engines, the compressor 200 allows the engine 10 to start operation with the use of air pressure only. For example, the compressor 200 can be configured to insert compressed air from a reservoir into the combustion chamber 26 between the piston 24 and the closed previous valve 30. Such injection moves the piston 24 to the next point in the annular bre 14 for reignition. To insure the proper location of the piston 24, a small brake can be applied to the flywheel 22 when the engine 10 is turned off to insure proper positioning of the piston 24 for restart. Accordingly, the use of the compressor 200 as part of the engine can minimize or eliminate the need for a starter motor, as found in conventional engines, and can reduce the overall, size, weight, and cost associated with the engine 10.

In one arrangement, the compressor operates synchronously with the engine. For example, the compressor 200 is connected to a drive mechanism 20 powered by the engine 10 through a transmission system 202. In one example arrangement, the transmission system 202 can be configured as a belt and gear system that includes a set of belts 204-1, 204-2 and corresponding gears 206-1, 206-2. As illustrated, the first belt 204-1 is operatively coupled to the drive mechanism or drive shaft 20 of the engine 10 and to the first gear 206-1, the second belt 204-2 is operatively coupled to the second gear 206-2 and to a compressor shaft 207, and the first gear 206-1 is operatively coupled to the second gear 206-2 via shaft 209. In one arrangement, to cover a speed range of between about 0 to 155 miles per hour (mph), a gear ratio (i.e., including the rear and transmission rears) of between about 1.00:1 (e.g., providing about 60 mph) and 2.57:1 (e.g., providing about 155 mph) can be utilized. Such a configuration can utilize a four-speed transmission with a rear gear ratio of 1:1 and a first gear ration also 1:1. This compares to a conventional drive train having a six-speed transmission of overall ratios of 12.23:1 in first gear (e.g., 30 mph max) to 2.18:1 in sixth gear (e.g., 155 mph max).

The transmission system 202 is configured to alter a ratio of compressor speed to engine speed to control a volume of compressed air generated by the compressor 200 and to control a compression ratio associated with the air and fuel. For example, as the transmission system 202 receives rotational input from the drive shaft 20, the system 202 applies a rotational output on the compressor shaft 207 to rotate the shaft 207 at a rate that is faster than the rotational rate of the drive shaft 20. This produces a high volume of air at a relatively high pressure. Accordingly, the transmission system 202 allows the compressor 200 to operate at a variety of ratios/speeds to optimize performance.

During operation, the compressor 200 generates relatively highly pressurized air which is then mixed with fuel from an injector close to the combustion chamber 26. This allows the input of the air/fuel mix into the combustion chamber 26 at very high pressures, such as pressures of between about 150 and 200 pounds per square inch (psi). Accordingly, the air/fuel mix enters the combustion chamber 26 at a relatively high velocity to create turbulence within the combustion chamber 26 which promotes a mixture of the air and fuel, as well as a short input duration (e.g., as measured in fractions of milliseconds). The high velocity and pressure of the air/fuel mix promote rapid combustion which contributes to the engine's 10 relatively high efficiency.

As indicated above, the compressor 200 is configured to perform two of the four stages or cycles utilized by an engine during operation, separate from the combustion process. Such a configuration allows the circulating pistons 24 in the bore 14 to exclusively perform the third stage (i.e., producing substantially continuous power) during operation. The engine 10 performs the fourth exhaust stage passively with a large, valveless port associated with the bore 14 and open to the air treatment system and atmosphere. When combustion and expansion is complete, the piston 24 passes the exhaust opening 38 and the spent gas within the chamber 26 is expelled from the engine. The compressor 200 is physically and thermally isolated from the combustion process. Accordingly, the compressor 200 does not experience blowby which, in conventional piston engines relates to the passage of combusted gases past the piston rings and into a crankcase. Traditional blowby causes the engine to accumulate contaminated exhaust gas that requires treatment before exhausted to the atmosphere. In addition, in conventional piston engines, the mixing of contaminated exhaust gases with the oil stored in the case significantly shortens the oil life causing more frequent oil changes. This oil itself must be treated before disposal or reuse.

Figure 9A:
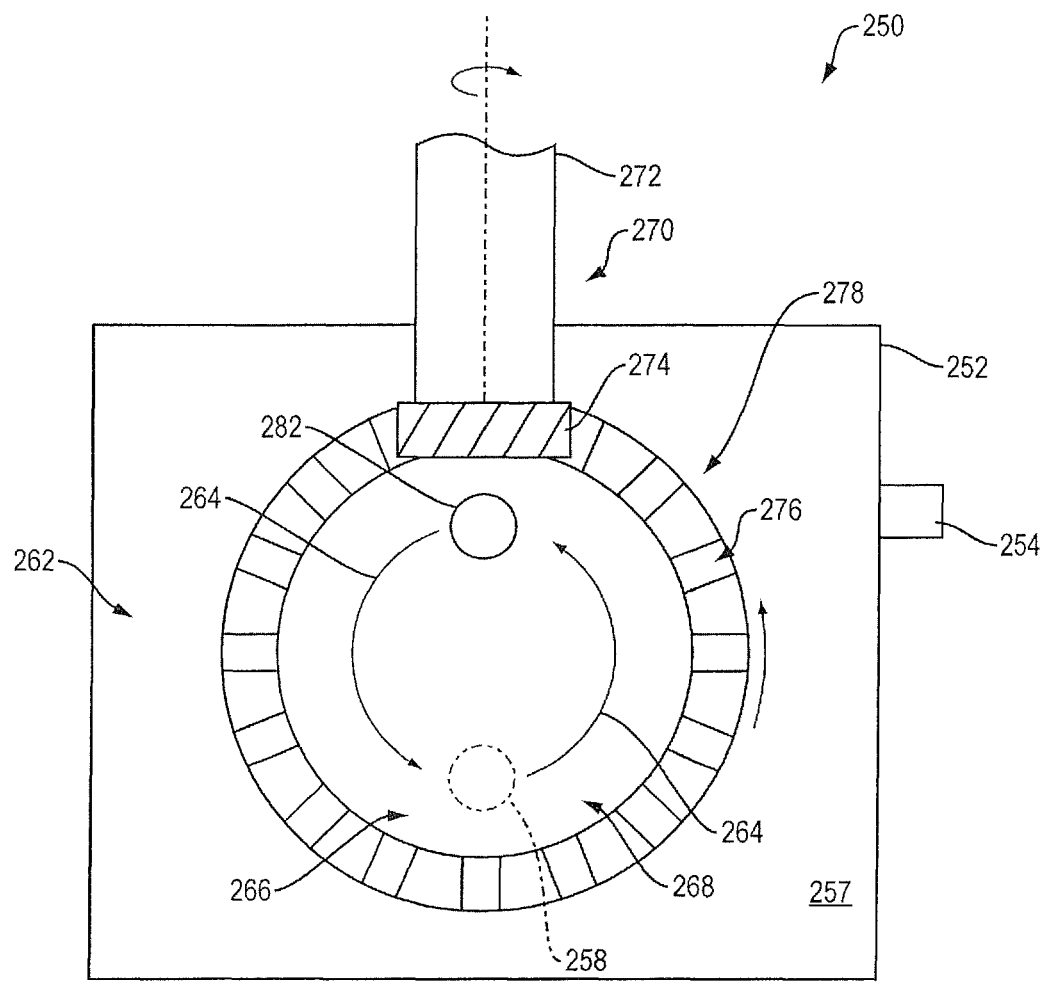
FIG. 9A illustrates a top schematic view of an air intake assembly, according to one arrangement.
Figure 9B:
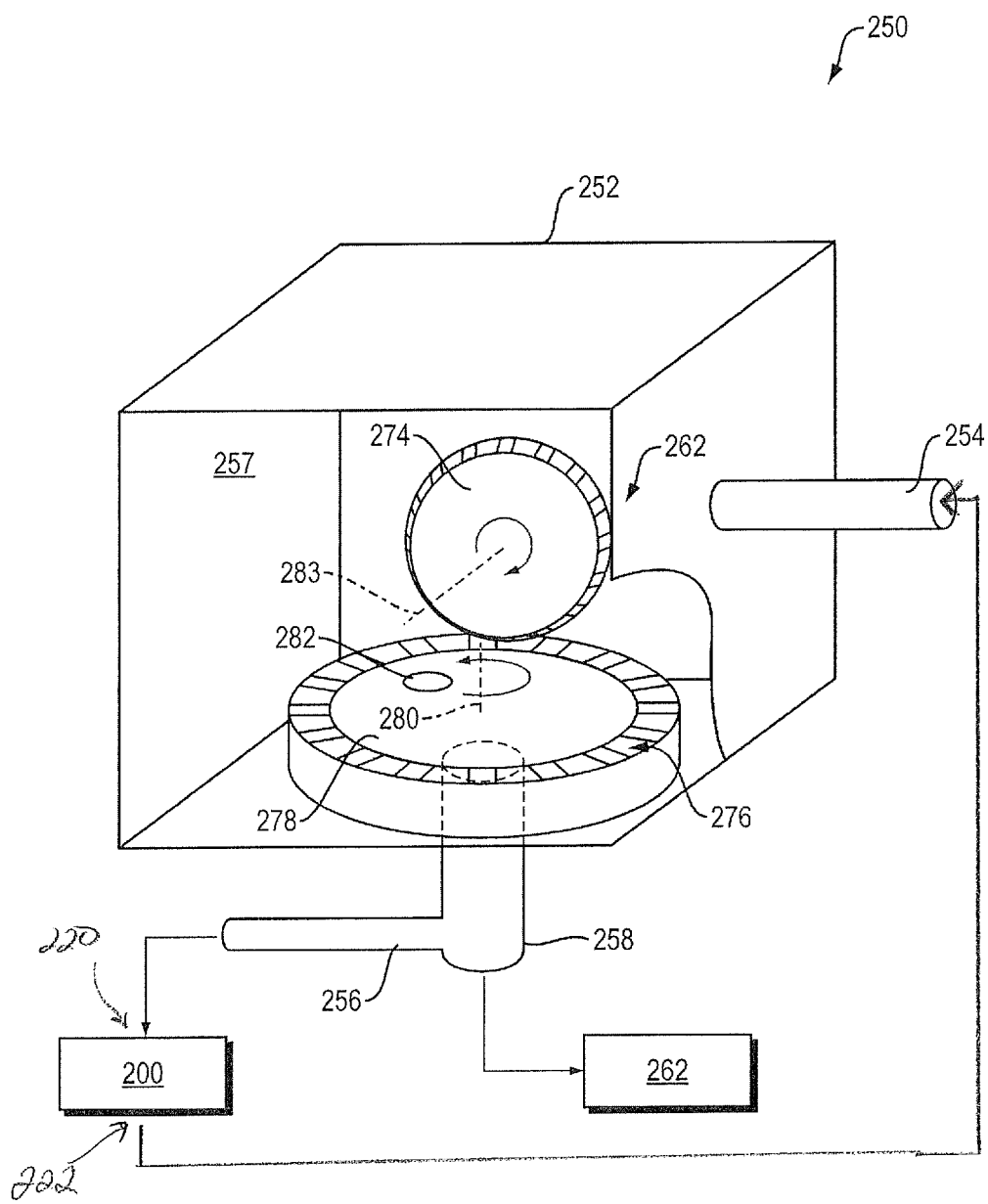
FIG. 9B illustrates a perspective cutaway view of a rotatable plate of the air intake assembly of FIG. 9A.
Figure 9C:
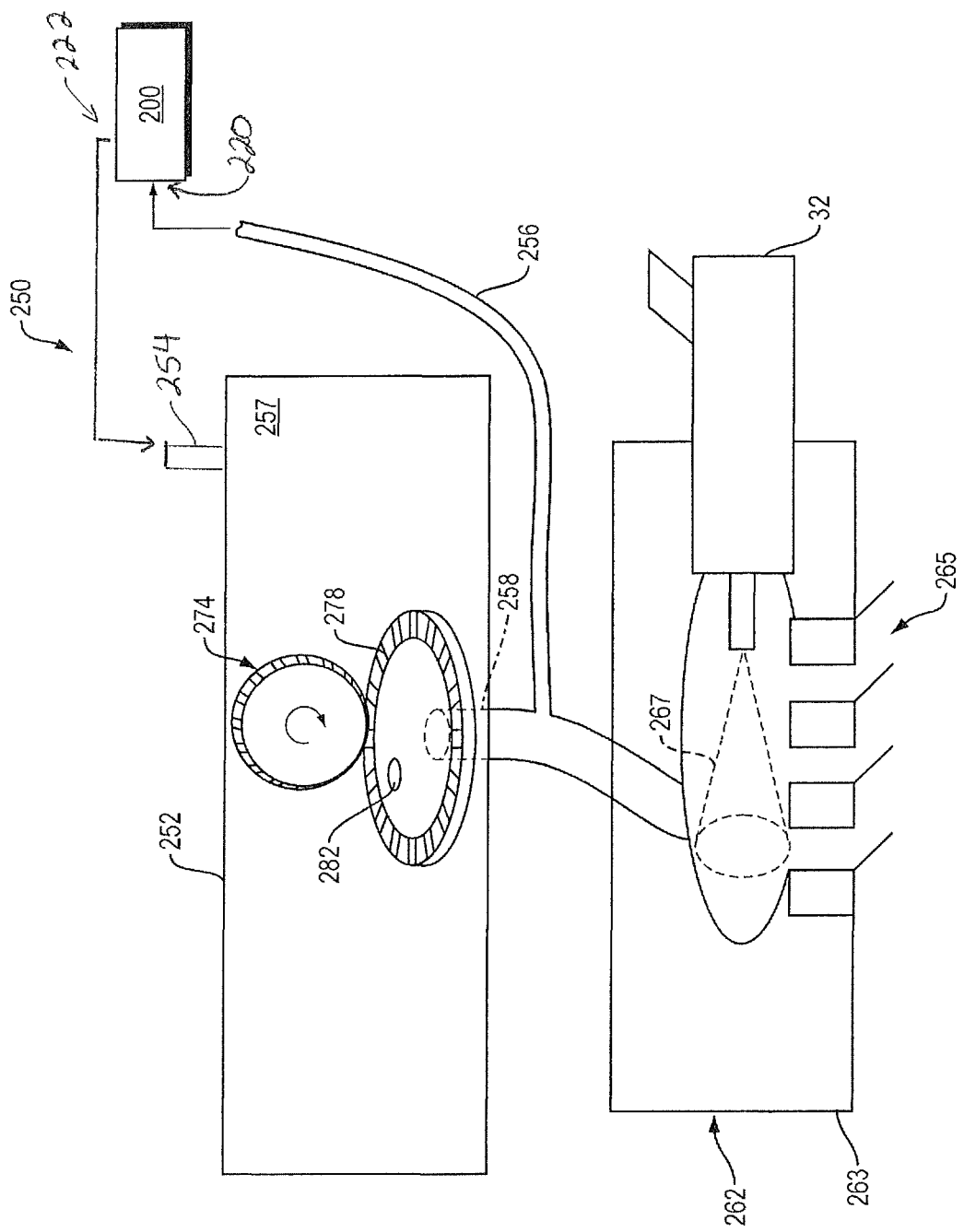
FIG. 9C illustrates a schematic view of the air intake assembly and a fuel distribution assembly of FIG. 9B.

With reference to FIG. 6, and as indicated above, valve 130 is configured to input the fuel-air mix from a fuel distribution assembly 262 into the combustion chamber 26. FIGS. 9A through 9C illustrate an example schematic representation of the air source or air intake assembly 250 and fuel distribution assembly 262.

As illustrated, the air intake assembly 250 includes a housing 252 having an air intake port 254 and an air output port 258. The air intake port 254 is configured to receive air from a high pressure air source, such as from an outlet 222 of the compressor 200. The air output port 258 is selectively disposed in fluid communication between the housing volume 257 and the fuel distribution assembly 262.

The air intake assembly 250 further includes a drive assembly 270 that is configured to provide selectable communication between the air output port 258 and the interior housing volume 257 of the housing 252. For example, the drive assembly 270 includes a shaft 272 disposed in operational communication with the engine 10 and gear 274, such as a worm gear, disposed at an end of the shaft 272 and a plate 278 that is rotatably coupled to the housing 252. The gear 274 is disposed in operational communication with a corresponding set of teeth 276 disposed about an outer periphery of the plate 278. The plate 278 is configured to rotate about a longitudinal axis 280 within the housing 252 in response to axial rotation of the drive assembly 270. For example, during operation, rotation of the shaft 272 and the gear 274 about longitudinal axis 282 in a clockwise direction causes the plate 278 to rotate within the housing 252 in a counterclockwise direction about longitudinal axis 280 within the housing 252. Additionally, the plate 278 defines an aperture 282 that is configured to selectively allow fluid communication between the port 258 and the housing volume 257, as described in detail below.

With reference to FIG. 9C, located in proximity to the air intake assembly 250 is the fuel distribution assembly 262. The fuel distribution assembly 262 is configured to allow mixing of the fuel and air within the assembly housing 263. Attached to the housing 263 is at least one fuel injector 32.

During operation, the plate 278 disposes the aperture 282 along a rotational path 264, as indicated in FIG. 9A. As the plate 278 rotates along a counterclockwise direction toward the output port 258, the plate 278 positions the aperture 282 along the path 264. With such positioning, the plate 278 blocks output port 258 and from the housing volume 257 to minimize or prevent fluid communication there between. Accordingly, the housing volume 257 of the air source 250 can receive relatively high pressure air from the compressor 200 via the air intake port 254. The compressor 200 is configured to perform a compression cycle on the air and to deliver the compressed, relatively high pressure air to the air source 250 during operation. The compression cycle is independent or separate from a combustion process associated with the piston assembly and the valves of the engine 10.

As the aperture 282 approaches a first open position 266, the fuel injector 32 injects fuel into the housing 263 of the fuel distribution assembly 262. As the plate 278 continues to rotate along the counterclockwise direction, the plate 278 disposes the aperture 282 in a first open position 266 which aligns the aperture 282 with the air output port 258. With such positioning, immediately following fuel injection, compressed air from assembly 250 is transported through port 258 of assembly 250 and into the fuel distribution assembly 262 to mixes the air with the suspended fuel 267. This mixture then flows through flexure valves 265 and into openings 141 of the valve 130, as indcted in FIG. 6.

In one arrangement, the air intake assembly 250 includes a bleed line 256 disposed in fluid communication with the housing volume 257 of the housing 252 and attached to an intake port 220 of the compressor 200. During operation the compressor 200 is configured to draw excess air from the housing volume 257 through the intake port 220 to reduce the relatively high pressure in assembly 262 and permit operation of the fuel injector 32 for a subsequent fuel distribution cycle which operates at lower pressure. The compressor 200 is configured to draw excess air from the housing volume 257 as part of an intake cycle which is independent or separate from a combustion process associated with the piston assembly and the valves of the engine 10.

Following the delivery of the air to the fuel distribution assembly 262, the plate 278 rotates the aperture 282 counterclockwise past the air output port 258 to allow introduction of pressurized air into the volume 257 for the subsequent fuel distribution cycle.

As provided above, the air intake assembly 250 and the fuel distribution assembly 262 operate in conjunction with each other to deliver a fuel and air mixture to a combustion chamber 26 of the engine 10. In certain cases gaseous fuel, such as natural gas, can be utilized with the engine 10 rather than liquid fuel. In such a case, the air intake assembly 250 can be configured to combine fuel and air into a fuel and air mixture and to provide this mixture combustion chamber 26 of the engine.

For example, assume the case where the compressor 220 is configured to receive natural gas from a natural gas source. During operation, the compressor 220 is configured to compress both the air and natural gas and to deliver both to the air intake assembly 250. Upon receipt of the compressed air and natural gas, the air intake assembly 250 is configured to selectively deliver the gas and air mixture to the engine 10, such as described above. Such a configuration eliminates the necessity of the fuel distribution assembly 262, including the fuel injector 32.

As provided above, blowby can occur in conventional piston engines when hot combustion gasses and their corrosive byproducts are forced past the piston rings into the interior of the engine. In one arrangement, the piston assembly 16 is configured to minimize or prevent blowby of combustion gasses relative to a piston 24 following a combustion within the combustion chamber 26.

Figure 11:
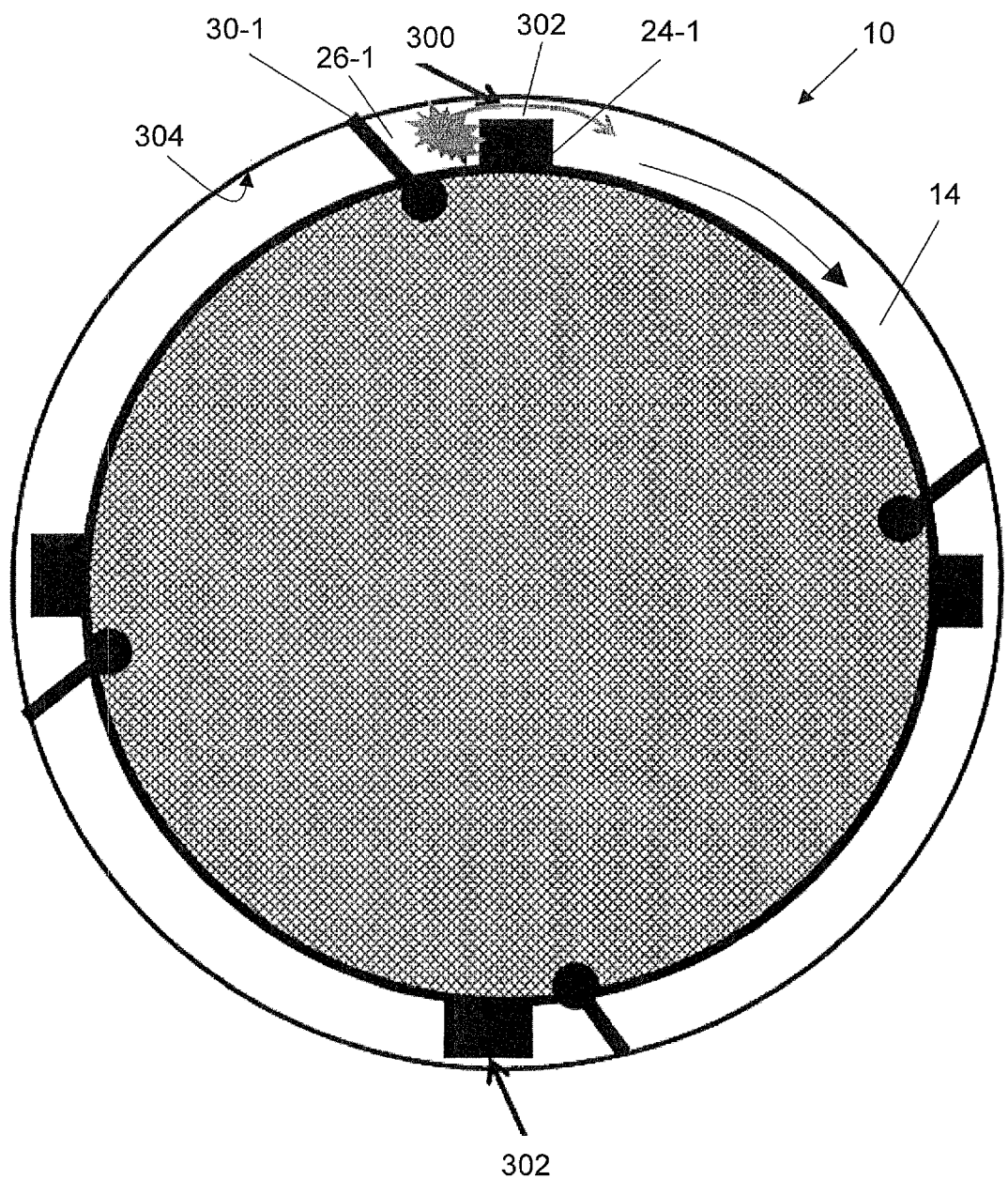
FIG. 11 illustrates an overhead, cross-sectional, schematic view of the engine of FIG. 1 having a piston assembly, according to one arrangement.

For example, with reference to FIG. 11 and taking the piston 24-1 as an example, combustion of a fuel and air mixture within the combustion chamber 26-1 between the valve 30-1 and piston 24-1 causes the piston 24-1 to rotate along a clockwise direction. However, following combustion of a fuel and air mixture, it is possible for the resulting combustion gasses 300 to accelerate at a higher rate than the piston 24-1 and to leak past, or blowby, a space 302 between the piston 24-1 and the inner wall 304 of the annular bore 14. This leakage can result in a reduced efficiency of combustion of the fuel and air mixture within the combustion chamber 26-1. For example, the leakage can reduce the force generated on the piston 24-1 following combustion of the fuel and air mixture. To limit the flow of combustion gas 300 past the piston 24-1 along a direction of rotation of the piston assembly 16 and the ability for the combustion gas 300 to outrun the associated piston 24-1, the piston assembly 16 can be configured with a seal assembly 400, examples of which are described below.

Figure 12:
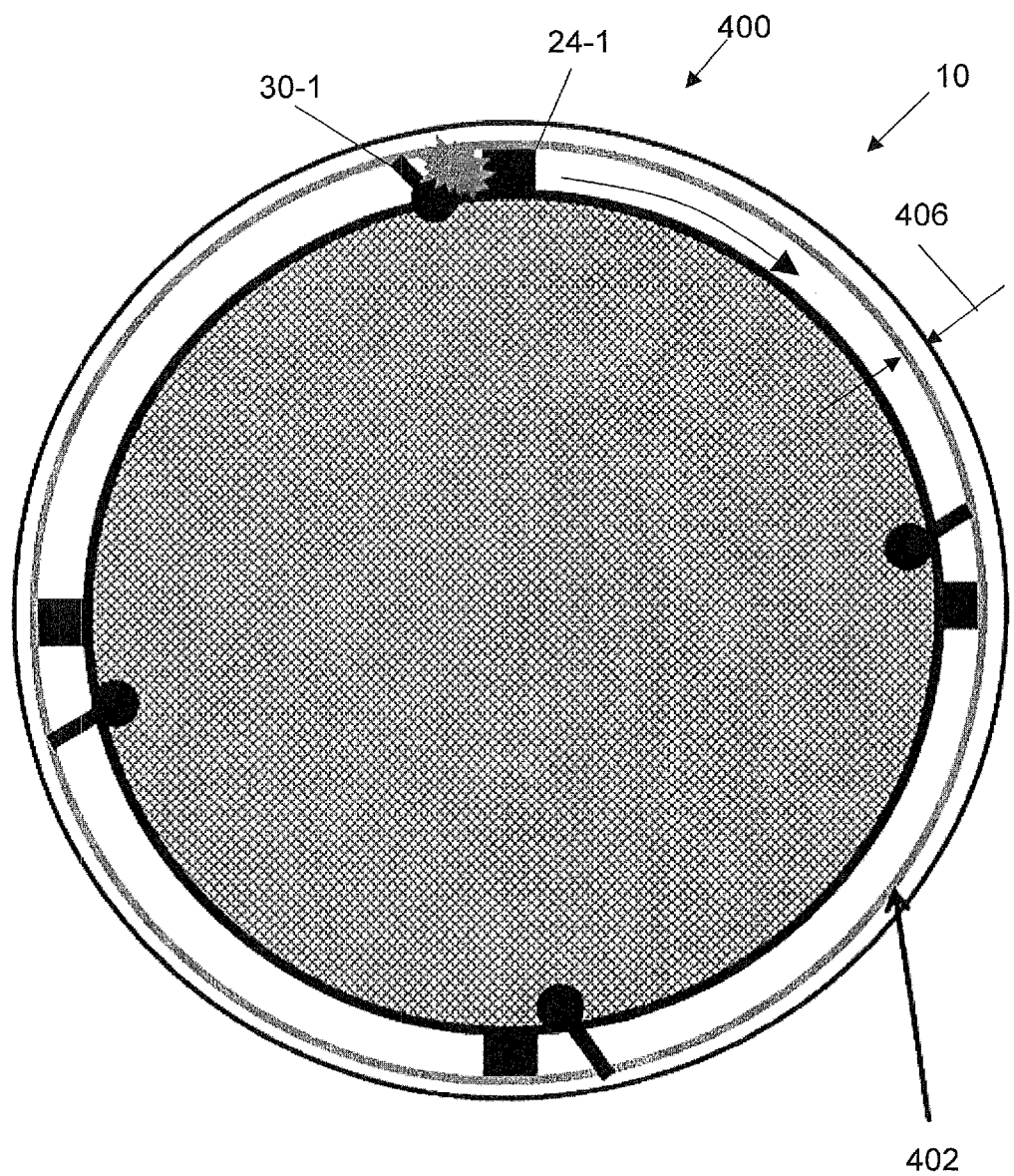
FIG. 12 illustrates the engine of FIG. 11 having a seal assembly connected to the piston assembly, according to one arrangement.
Figure 13:
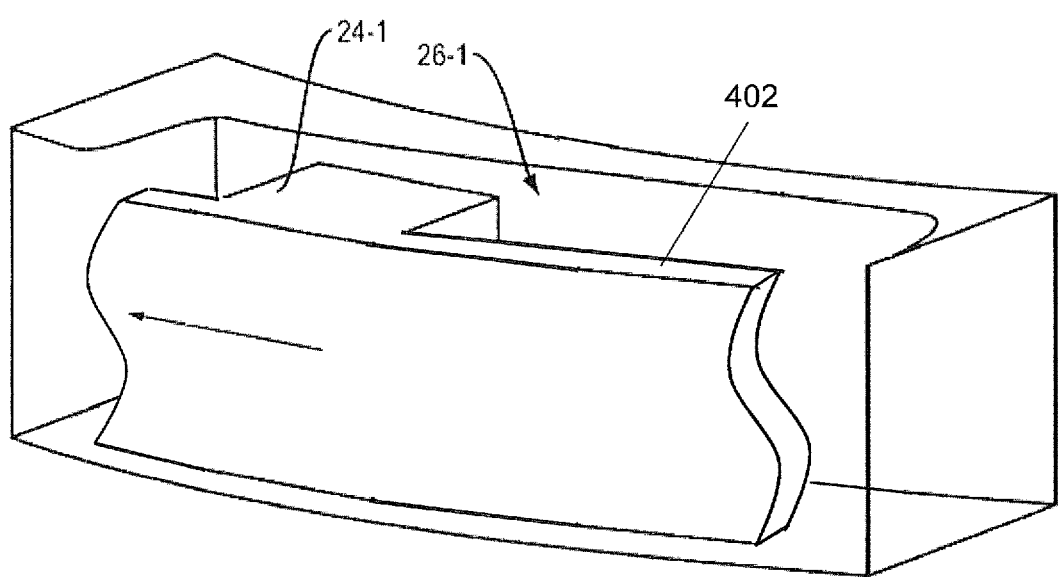
FIG. 13 illustrates a partial sectional view of a portion of the annular bore of the engine of FIG. 12, according to one arrangement.
Figure 14:
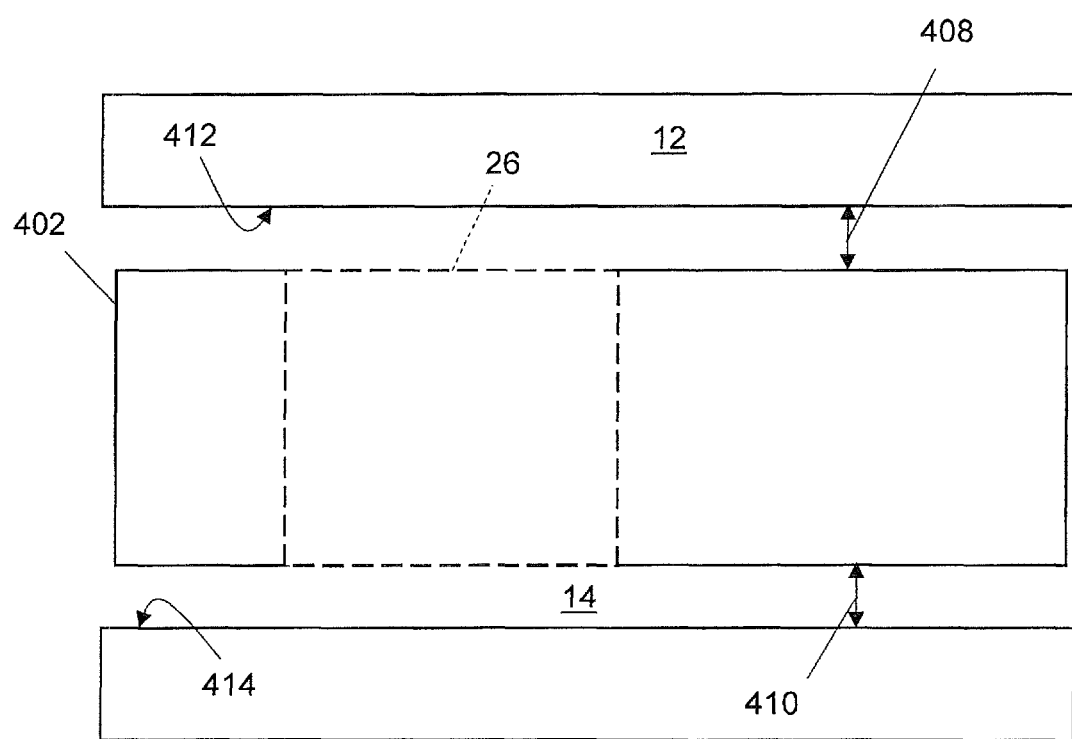
FIG. 14 illustrates a side, sectional, schematic view of the seal assembly of FIG. 12, according to one arrangement.

In one arrangement, with reference to FIGS. 12 and 13, the seal assembly 400 includes a sealing ring 402 coupled to the pistons 24 of a piston assembly 16. For example, as shown in FIG. 12, the sealing ring 402 extends about an outer periphery of the pistons 24 of the piston assembly. The sealing ring 402 is disposed between an outer face of each piston 24 and an inner wall 304 of the annular bore 14 of the housing 12 to define a vertical clearance space 406 there between. While the clearance space 406 can have a variety of dimensions, in one arrangement, the clearance space 406 defines a length of between about 0.001 and 0.0015 inches. Further, with reference to FIG. 14, the sealing ring 402 defines lateral clearance spaces 408, 410 between a ceiling wall 412 and a floor 414 of the annular bore 14, respectively. While the clearance spaces 408, 410 can have a variety of dimensions, in one arrangement, the clearance spaces 408, 410 each define a length of between about 0.001 and 0.0015 inches. In one arrangement, the clearance spaces 406, 408, 410 can include a lubricant, such as a lubricating fluid including air or oil, to minimize direct contact between the sealing ring 402 and the inner wall 304, the ceiling wall 412, and the floor 414 of the annular bore 14 of the housing 12.

The sealing ring 402 is coupled to each of the pistons 24 and is configured to rotate with the pistons 24 during operation as the piston assembly 16 and flywheel 22 rotate within the annular bore 14. The sealing ring 402 can be connected to the pistons 24 in a variety of ways. For example, the sealing ring 402 can be coupled to each piston 24 of the piston assembly 16 using fasteners. In another example, the sealing ring 402 can be welded to each piston 24 or can form a friction fit connection with each piston 24. With the sealing ring 402 being coupled to each piston 24 of the piston assembly 16, the sealing ring 402 provides lateral and vertical stability to the pistons 24, thereby minimizing the generation of bending forces on each piston 24 as caused by piston loading following combustion.

The sealing ring 402 can be manufactured from a variety of materials. In one arrangement, the sealing ring 402 is manufactured from a material having a coefficient of thermal expansion that is substantially equal to the coefficient of thermal expansion of the material that forms the piston assembly 16. As such, during operation, as the temperature of the engine 10 changes, the sealing ring 402 can expand or contract at substantially the same rate as the pistons 24 of the piston assembly.

As provided above, the sealing ring 402 is configured to limit or prevent combustion gasses from flowing from the combustion chamber 26 and into the vertical clearance space 406 between the inner wall 304 and the piston 24. For example, with reference to FIGS. 12 and 13, during operation, a detonation of a fluid and air mixture within the combustion chamber 26-1 generates a load on the corresponding piston 24-1 and causes the piston 24-1 to rotate in a clockwise direction. With the sealing ring 402 being attached to each piston 24 of the piston assembly 12, the sealing ring 402 rotates with the piston assembly 12 and flywheel 22. The sealing ring 402 forms a barrier to the expansion of the combustion gasses, relative to the inner wall 304 of the annular bore 14. Therefore, in the case where the combustion gasses accelerate at a rate that is greater than the pistons 24, because the sealing ring rotates with the pistons 24, the sealing ring 402 limits the ability of the gasses to flow between the outer peripheral face of the piston 24-1 and the inner wall 304 of the annular bore 14. This, in turn, maintains the force of the combustion on the corresponding piston 24 which results in a combustion event with a relatively high level of efficiency.

With the above-referenced configuration of the sealing ring 304, during operation at relatively high rotational velocities, the piston assembly 16 limits the ability of combustion gasses from flowing past a corresponding piston 24 within the clearance spaces 408, 410. However, at relatively lower rotational velocities, it is possible for combustion gasses to flow into the clearance spaces 408, 410. In one arrangement, to limit such flow, each piston 24 can include a set of vertical sealing elements 430 configured to seal the clearance spaces 408, 410.

Figure 15:
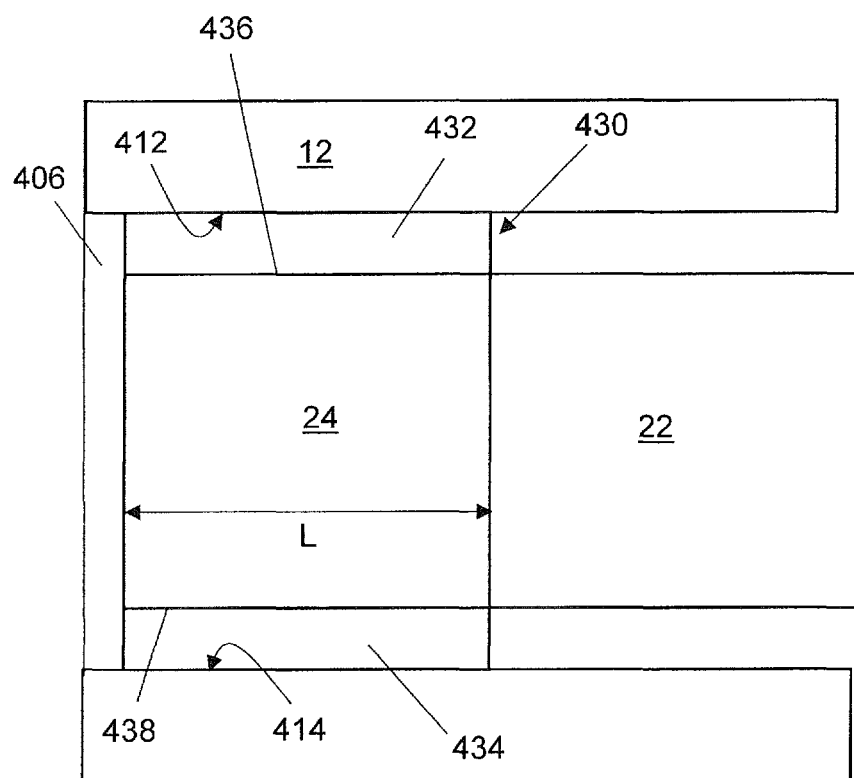
FIG. 15 illustrates a front, sectional, schematic view of a seal assembly connected to a piston assembly, according to one arrangement.
Figure 16:
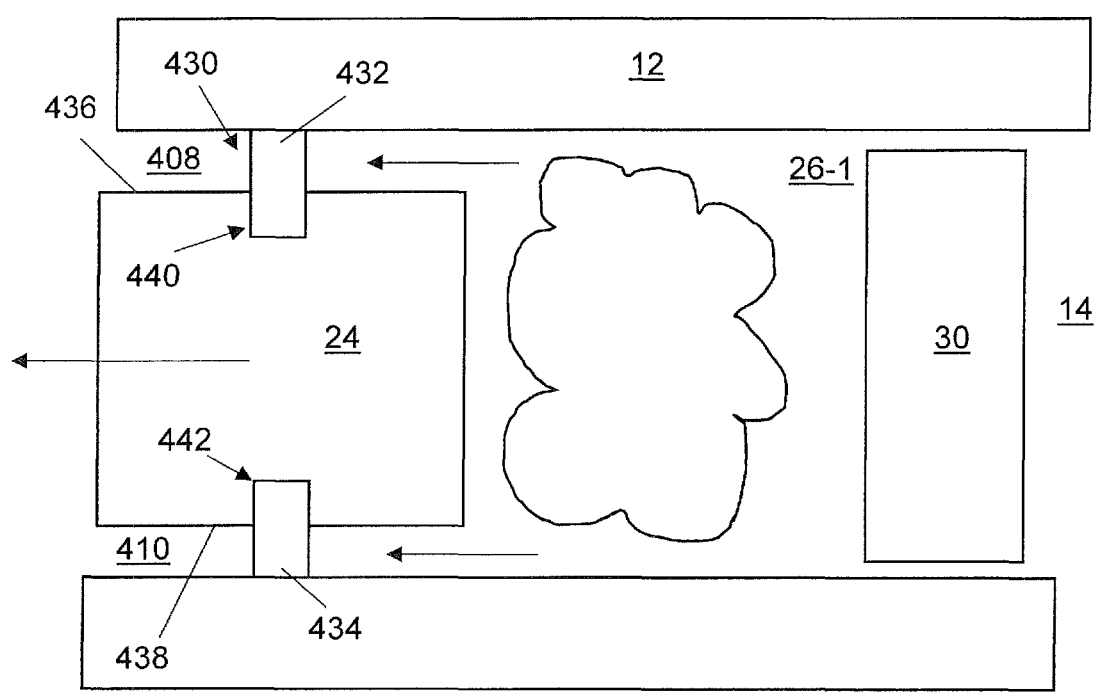
FIG. 16 illustrates a side, sectional, schematic view of a seal assembly connected to a piston assembly, according to one arrangement.

For example, with reference to FIGS. 15 and 16, the set of vertical sealing elements 430 can include a first vertical sealing element 432 and a second vertical sealing element 434. The first vertical sealing element 432 is disposed in sealing contact between a first face 436 of the piston 24 and a ceiling wall 412 of the annular bore 14 while the second vertical sealing element 434 is disposed in sealing contact between a second face 438 of the piston 24 and a floor 414 of the annular bore 14. Further, with reference to FIG. 15, each of the first and second vertical sealing elements 432, 434 can extend along a length L of the piston, from the flywheel 22 to clearance space 406.

The first and second vertical sealing elements 432, 434 can be configured as a variety of types of seals. For example, each of the first and second vertical sealing elements 432, 434 can be configured as a brush seal or as a spring seal. In the case where the first and second vertical sealing elements 432, 434 are configured as a spring seal, the elements 432, 434 can be manufactured from a variety of materials. For example, the spring seal can be manufactured from an aluminum or steel material and can include a lubrication layer disposed between the spring seal and the walls 412, 414 of the annular bore. In one arrangement, the spring seal can be manufactured from a friction-reducing material, such as BEARIUM® metal.

The first and second vertical sealing elements 432, 434 can be coupled to a corresponding piston 24 in a variety of ways. In one arrangement, the first and second vertical sealing elements 432, 434 form a friction fit with corresponding channels 440, 442 of the piston 24. With such a configuration, an operator can readily remove and replace the sealing elements 432, 434 to maintain the performance of the engine 10.

With reference to FIG. 16, during operation, a detonation of a fluid and air mixture within the combustion chamber 26-1 generates a load on the corresponding piston 24-1 and causes the piston 24-1 to rotate in a clockwise direction within the annular bore 14. With the sealing elements 432, 434 being attached to the piston 24-1, the sealing elements 432, 434 rotate with the piston assembly 12 and flywheel 22. The sealing elements 432, 434 forms a barrier to the expansion of the combustion gasses, relative to the clearance spaces 408, 410. Therefore, in the case where the rotational velocity of the piston assembly 16 is less than the velocity of the combustion gasses 300, the sealing elements 432, 434 limits the ability of the gasses 300 to flow within the clearance spaces 408, 410 ahead of the piston 24. This, in turn, maintains the force of the combustion on the corresponding piston 24, which results in a combustion event with a relatively high level of efficiency.

It is noted that while the sealing ring 402 and the set of vertical sealing elements 430 are shown and described as being used with the piston assembly 16 separately, such description is by way of example only. It should be understood that both sealing ring 402 and the set of vertical sealing elements 430 can be used simultaneously with the piston assembly 16.

While various embodiments of the innovation have been particularly shown and described, it will be understood by those skilled in the art that various changes in form and details may be made therein without departing from the spirit and scope of the innovation as defined by the appended claims.

For example, as described above, the piston assembly includes four pistons and the valve assembly includes four valves. Such description is by way of example only. In one arrangement, the piston assembly can include a first piston and a second piston, the first piston disposed within the annular bore at a position that is substantially 180° from the second piston. Additionally, the valve assembly can include a first valve disposed at a first location within the housing and a second valve disposed at a second location within the housing, the second valve being disposed along the annular bore at a position that is substantially 180° relative to the first valve.

As indicated above, the valve assembly 118 includes a toggling assembly 155, as shown in FIGS. 4, 5, and 7A, configured to toggle the valve 130 within the housing 129. As described, the arms 157, 159 of the toggling assembly 155 are coupled to a cam assembly 165 that includes a barrel cam, such as a conjugate splined barrel cam 170, a rocker arm 174, and a toggle element 176 coupled between the rocker arm 174 and the first and second arms 157, 159. During operation, the first arm 157 is configured to generate a first, positive load 162 on the first end 158 of the valve 130 along a positive displacement direction to pivot the valve 130 toward the first position and the second arm 159 is configured to generate a second, positive load 164 on the second end 160 of the valve 130 along the positive displacement direction to pivot the valve 130 toward the second position. Such description is by way of example only. In one arrangement, the toggling assembly is configured with a reduced number of moving parts that extends a connection between the valve 130 and the cam 170 along an axis of rotation of the valve 130.

Figure 10:
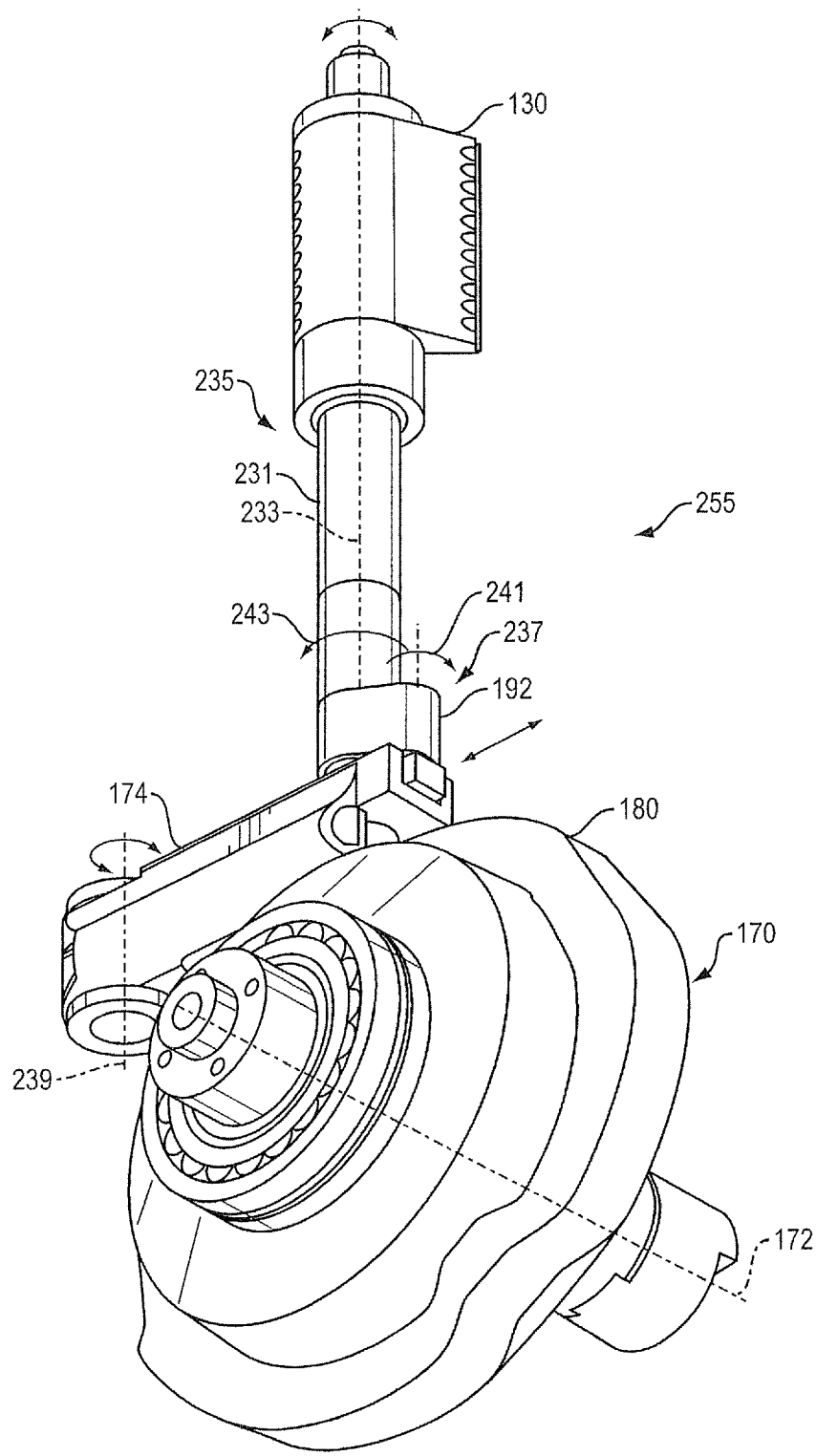
FIG. 10 illustrates a perspective view of a rocker arm disposed between a valve and a splined barrel cam.

For example, with reference to FIG. 10, the toggling assembly 255 includes a valve support 231 extending along a longitudinal axis 233 of the valve 130 between the valve 130 and the rocker arm 174. A first end 235 of the valve support 231 is coupled to the valve 130 while a second end of the valve support 237 is slidably coupled to the rocker arm 170 via a sliding/pivot joint 192. While the valve support 231 can be configured in a variety of ways, in one arrangement, the valve support 231 is configured as a substantially cylindrical, tubular structure.

During operation, as the conjugate splined barrel cam 170 rotates about the axis 172, the spline profile or element 180 of the cam 170 oscillates the rocker arm 174 in both a clockwise and counterclockwise direction about an axis of rotation 239. In response to the oscillation of the rocker arm 174, the sliding/pivot joint 192 exerts a first rotational load 241 and an opposing second rotational load 243 on the valve support 231 to oscillate the valve support 231 and the valve 130 about longitudinal axis 233. Such oscillation positions the valve 130 between a first (e.g., open) position and a second (i.e., closed) position within the valve housing.

Use of the valve support 231 provides the toggling assembly 255 with a relatively low moment of inertia which, in turn, allows the rocker arm 174 to toggle the valve 130 within the valve housing at a relatively high speed. Additionally, because the valve support 231 has relatively few parts, the valve support 231 reduces the possibility of the toggling assembly 255 failing during operation.

Furthermore, the valve support 231 provides the toggling assembly 255 with a relatively long life. For example, during operation as the piston 24 approaches the valve 130, the valve 130 must move to an open position (i.e., out of the piston's path) and then back to a closed position in a relatively short amount of time. Once the toggle assembly 255 moves the valve 130 to a closed position, the valve 130 defines a combustion chamber relative to the piston 24 and the gas pressure within the chamber builds at a relatively high rate. The gas pressure within the combustion chamber creates not only a force that propels the piston 24 forward, but an equal and opposite force on the valve 130 itself. With the configuration of the valve support 231 as a substantially cylindrical, tubular structure, the valve support 231 has a relatively large stiffness which increases the overall stiffness of the valve assembly and minimizes failure.

As indicated above, each valve 30 of the valve assembly 18 is moveably disposed within an annular bore to create a temporary combustion chamber 26 relative to a corresponding piston 24. For example, with reference to FIG. 2B, when the piston 24-1 reaches a given location within the annular bore 14, the valve 30-1 moves to a second position relative to the annular bore 14. With such positioning, the valve 30-1 forms the combustion chamber 26-1 relative to the piston 24-1 and is configured as a bulkhead against which combustion can work to produce power. In one arrangement, the size of the combustion chamber 26 can be altered during operation to adjust the power output or efficiency of the engine. For example, the volume of the combustion chamber 26 can be decreased or increased by varying the duration of the fuel input process to the combustion chamber 26 and by adjusting (e.g., delaying) the ignition timing accordingly. In the case where the volume of the combustion chamber 26 is increased, the engine can include a second spark plug (not shown) located adjacent to the relatively larger combustion chamber 26 to accelerate combustion in the enlarged chamber.

It should be noted that the walls of the combustion chamber 26 and the direction of introduction of fuel relative to the valve can be modified to create a variety of geometric travel paths for the air/fuel mixture. For example, the walls of the combustion chamber 26 and the direction of fuel introduction can define a circular or other geometry to accelerate ignition and combustion effectiveness.

As indicated above, in order to control the power and output torque of the engine 10 as necessary, the engine 10 can fire anywhere from one to sixteen times per revolution. In one arrangement, the engine 10 can be configured to alternate the firing order of the combustion chambers 26 to reduce the operating temperature of the engine 10. For example, with reference to FIG. 1, in the case where the engine 10 has accelerated to a particular drive mechanism 20 velocity, the engine 10 can require firing of only two combustion chambers 26 during a revolution of the piston assembly 30 within the engine 10 to maintain the velocity. To minimize the engine temperature, in a first revolution cycle, the first 26-1 and third 26-3 combustion chambers can be fired while in a second revolution cycle, the second 26-2 and fourth 26-4 combustion chambers can be fired. When certain combustion chambers 26 are not fired, relatively low temperature air flows through those combustion chambers as well through the annular bore 12, thereby reducing the operating temperature of the engine 10. This allows a leaner fuel-air mixture to be utilized during operation to improve engine efficiency and air quality.

What is claimed is:

1. An engine, comprising:
   a housing defining an annular bore;
   a piston assembly disposed within the annular bore;
   at least one valve configured to oscillate between a first position within the annular bore to allow the piston assembly to travel within the annular bore from a first location proximate to the at least one valve to a second location distal to the at least one valve and a second position within the annular bore to define a combustion chamber relative to the piston assembly at the second location;
   an exhaust gas port disposed in fluid communication with the combustion chamber; and
   a fuel distribution assembly, the fuel distribution assembly configured to mix fuel from a fuel source and air from an air source into a fuel and air mixture at a location external to the combustion chamber and to deliver the fuel and air mixture to the combustion chamber, wherein the fuel distribution assembly is disposed in fluid communication with the at least one valve and is configured to deliver the fuel and air mixture to the combustion chamber via the at least one valve.

2. The engine of claim 1, wherein the at least one valve defines a set of openings, the at least one valve configured to move between the first position to fluidly decouple the set of openings relative to the fuel distribution assembly, and the second position to fluidly couple the set of openings with the fuel distribution assembly to direct the fuel and air mixture into the combustion chamber defined between the piston assembly and the at least one valve.

3. The engine of claim 2, wherein the set of openings are configured to carry the fuel and air mixture along a direction transverse to a longitudinal axis of the at least one valve.

4. The engine of claim 1, wherein the fuel distribution assembly comprises:
   a fuel distribution assembly housing defining a fuel distribution assembly housing volume disposed in fluid communication with the air source;
   a fuel injector configured to provide fuel to the fuel distribution assembly housing volume, the fuel distribution assembly housing volume configured to receive air from the air source following injection of fuel by the fuel injector.

5. The engine of claim 4, wherein the fuel distribution assembly further comprises a set of flexure ports disposed in fluid communication with the at least one valve, the set of flexure ports configured to deliver the fuel and air mixture to the to the combustion chamber via the at least one valve.

6. The engine of claim 1, wherein the air source comprises an air intake assembly, the air intake assembly comprising:
   an air intake assembly housing defining a housing volume;
   an air intake port provided on the air intake assembly housing;
   an air outlet port provided on the air intake assembly housing and disposed in fluid communication with the fuel distribution assembly; and
   a drive assembly provided on the air intake assembly housing, the drive assembly configured to provide selectable communication between the housing volume and the air outlet port.

7. The engine of claim 6, wherein the drive assembly comprises a plate that is rotatably coupled to the air intake assembly housing and is configured to align an aperture defined by the plate with the air outlet port to selectively provide fluid communication between the air outlet port and the fuel distribution assembly.

8. The engine of claim 1, further comprising a compressor disposed in fluid communication with the air source, the compressor configured to perform a compression cycle and to deliver compressed air to the air source and configured to perform an intake cycle to draw excess air from the air source, the compression cycle and the intake cycle separate from a combustion process associated with the piston assembly and the at least one valve.

9. The engine of claim 8, further comprising a transmission system configured to adjust a ratio of engine speed to compressor speed to control a compression ratio associated with the fuel from the fuel source and the air from the air source.

10. The engine of claim 1, wherein the at least one valve defines a channel, the channel configured to define, in conjunction with the housing, a passageway that allows the piston assembly to travel within the annular bore from the first location proximate to the at least one valve to the second location distal to the at least one valve when the at least one valve is disposed in the first position.

11. The engine of claim 1, wherein the piston assembly comprises a sealing assembly connected to the piston, the sealing assembly configured to limit the flow of combustion gas past a piston of the piston assembly along a direction of rotation of the piston assembly.

12. The engine of claim 11, wherein the sealing assembly comprises a sealing ring coupled to each piston of the piston assembly, the sealing ring disposed between an outer face of each piston of the piston assembly and an inner wall of the annular bore of the housing and defining a clearance space there between.

13. The engine of claim 11, wherein the piston assembly comprises a set of vertical sealing elements coupled to each piston of the piston assembly, a first vertical sealing element of the set of vertical sealing elements disposed in sealing contact between a first face of each piston and a ceiling wall of the annular bore and a second vertical sealing element of the set of vertical sealing element disposed in sealing contact between a second face of each piston and a floor of the annular bore, the first face opposing the second face.

14. An engine, comprising:
a housing defining an annular bore;
a piston assembly disposed within the annular bore, the piston assembly configured to be connected to a drive mechanism;
at least one valve configured to oscillate between a first position within the annular bore to allow the piston assembly to travel within the annular bore from a first location proximate to the at least one valve to a second location distal to the at least one valve and a second position within the annular bore to define a combustion chamber relative to the piston assembly at the second location;
an exhaust gas port disposed in fluid communication with the combustion chamber;
a fuel distribution assembly, the fuel distribution assembly configured to mix fuel from a fuel source and air from an air source into a fuel and air mixture; and
a compressor disposed in fluid communication with the air source, the compressor configured to perform a compression cycle and to deliver compressed air to the air source and configured to perform an intake cycle to draw excess air from the air source, the compression cycle and the intake cycle separate from a combustion process associated with the piston assembly and the at least one valve.

15. The engine of claim 14, wherein the air source comprises an air intake assembly, the air intake assembly comprising:
an air intake assembly housing defining a housing volume;
an air intake port provided on the air intake assembly housing and disposed in fluid communication with an outlet of the compressor;
an air outlet port provided on the air intake assembly housing and disposed in fluid communication with the fuel distribution assembly and disposed in fluid communication with an inlet of the compressor; and
a drive assembly provided on the air intake assembly housing, the drive assembly configured to provide selectable communication between the housing volume and the air outlet port.

16. The engine of claim 14, further comprising a transmission system configured to adjust a ratio of engine speed to compressor speed to control a compression ratio associated with the fuel from the fuel source and the air from the air source.

17. The engine of claim 16, wherein the transmission system is disposed in operative communication with the piston assembly via a drive shaft and is disposed in operative communication with the compressor via a compression shaft.

18. The engine of claim 14, wherein the piston assembly comprises a sealing assembly connected to the piston, the sealing assembly configured to limit the flow of combustion gas past a piston of the piston assembly along a direction of rotation of the piston assembly.

19. The engine of claim 18, wherein the sealing assembly comprises a sealing ring coupled to each piston of the piston assembly, the sealing ring disposed between an outer face of each piston of the piston assembly and an inner wall of the annular bore of the housing and defining a clearance space there between.

20. The engine of claim 18, wherein the piston assembly comprises a set of vertical sealing elements coupled to each piston of the piston assembly, a first vertical sealing element of the set of vertical sealing elements disposed in sealing contact between a first face of each piston and a ceiling wall of the annular bore and a second vertical sealing element of the set of vertical sealing element disposed in sealing contact between a second face of each piston and a floor of the annular bore, the first face opposing the second face.

21. An engine, comprising:
a housing defining an annular bore;
a piston assembly disposed within the annular bore, the piston assembly comprises a sealing assembly connected to the piston assembly, the sealing assembly configured to limit the flow of combustion gas past a piston of the piston assembly along a direction of rotation of the piston assembly;
wherein the sealing assembly comprises a sealing ring coupled to each piston of the piston assembly, the sealing ring disposed at an outer periphery of the piston assembly between an outer face of each piston of the piston assembly and an inner wall of the annular bore of the housing and defining a clearance space there between;
at least one valve configured to oscillate between a first position within the annular bore to allow the piston assembly to travel within the annular bore from a first location proximate to the at least one valve to a second location distal to the at least one valve and a second position within the annular bore to define a combustion chamber relative to the piston assembly at the second location; and
an exhaust gas port disposed in fluid communication with the combustion chamber.

22. The engine of claim 21, wherein the piston assembly comprises a set of vertical sealing elements coupled to each piston of the piston assembly, a first vertical sealing element of the set of vertical sealing elements disposed in sealing contact between a first face of each piston and a ceiling wall of the annular bore and a second vertical sealing element of the set of vertical sealing element disposed in sealing contact between a second face of each piston and a floor of the annular bore, the first face opposing the second face.

* * * * *